Oct. 23, 1956  R. L. MERRILL ET AL  2,767,914
STATISTICAL QUALITY-CONTROL SYSTEM
Filed Nov. 18, 1953  6 Sheets-Sheet 1

INVENTORS.
Roger L. Merrill
William Hecox
BY
ATTORNEYS.

INVENTORS.
Roger L. Merrill
William Hecox
BY
ATTORNEYS.

Oct. 23, 1956    R. L. MERRILL ET AL    2,767,914
STATISTICAL QUALITY-CONTROL SYSTEM
Filed Nov. 18, 1953    6 Sheets-Sheet 3

INVENTORS.
Roger L. Merrill
William Hecox
BY
ATTORNEYS.

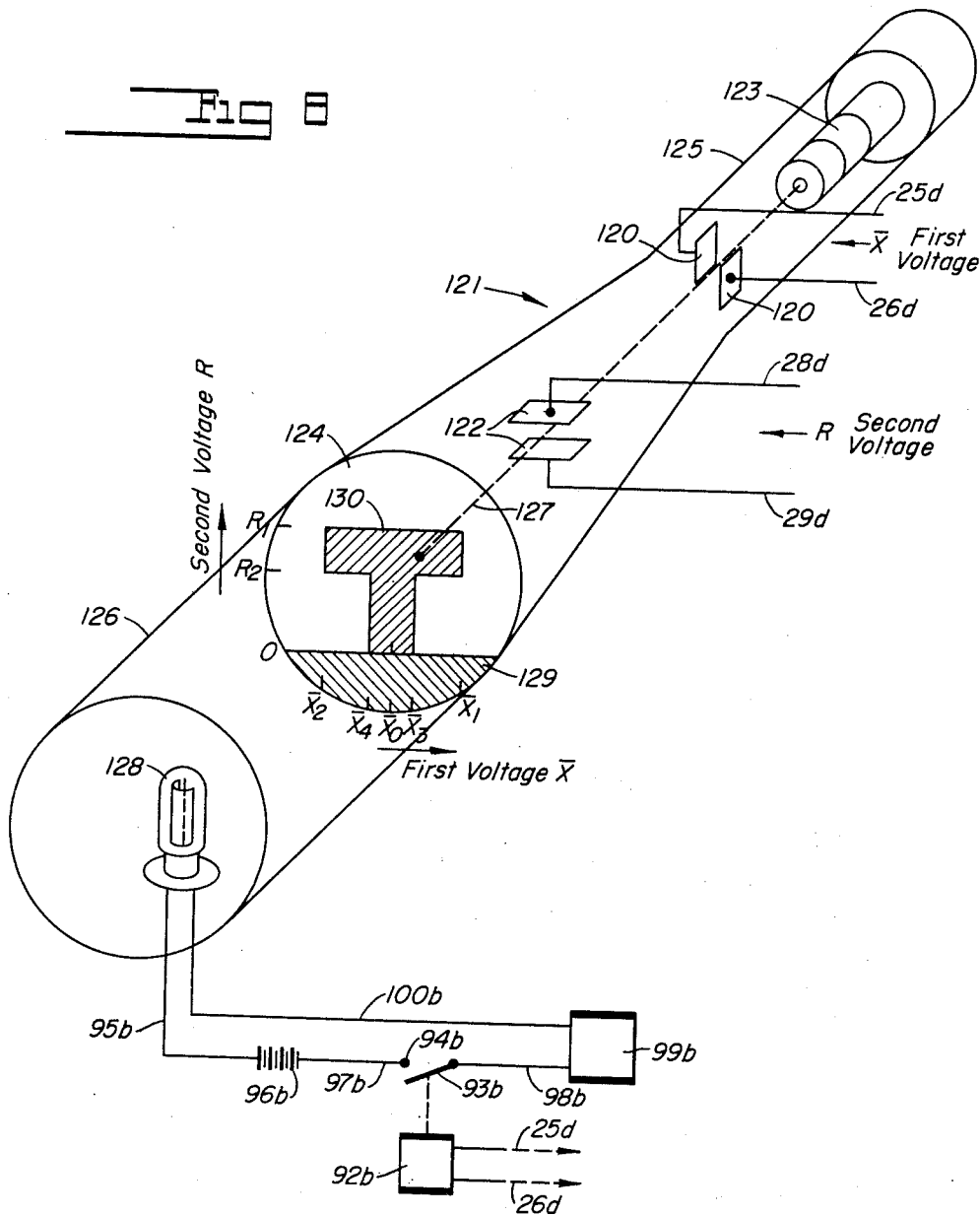

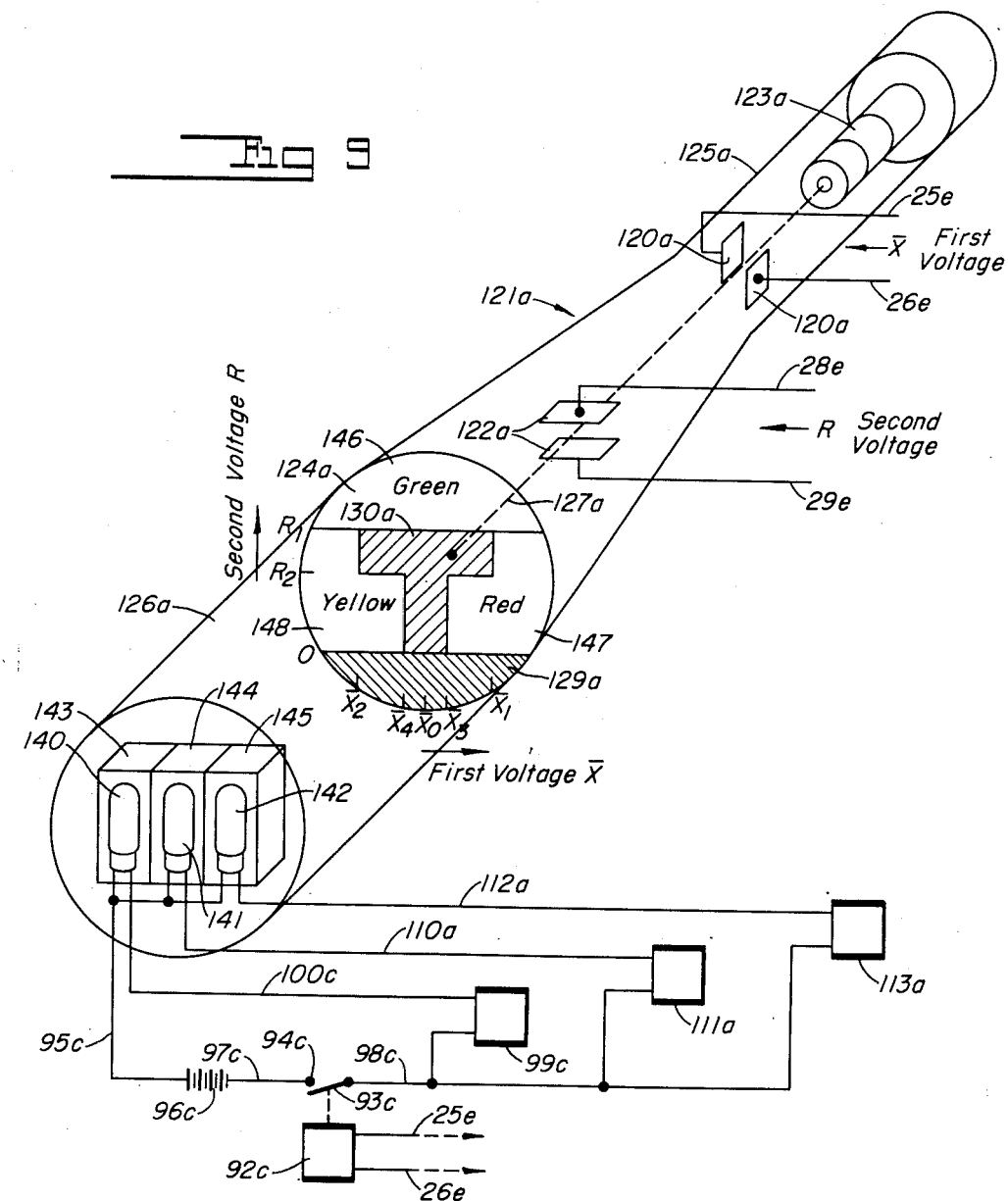

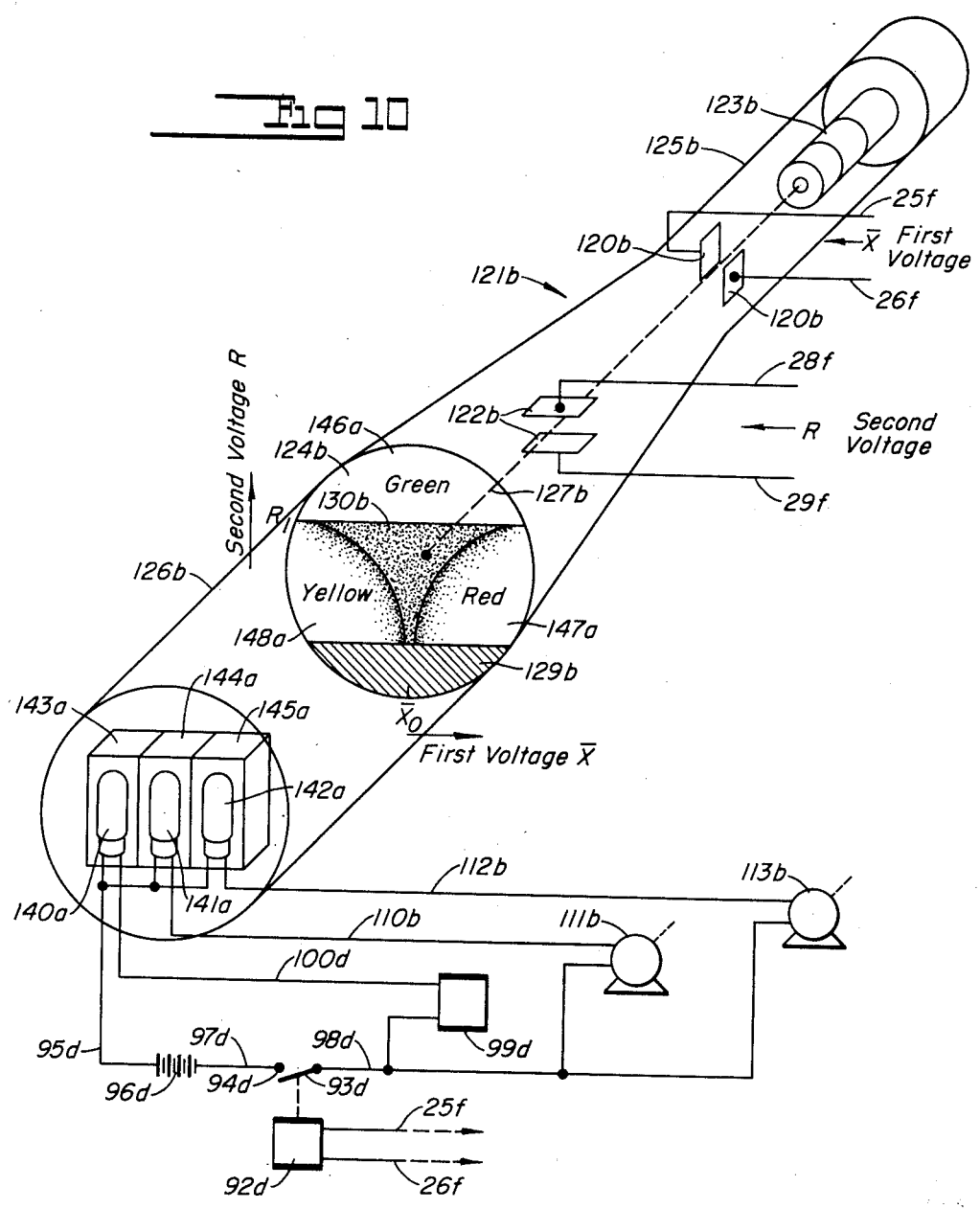

United States Patent Office 2,767,914
Patented Oct. 23, 1956

2,767,914

STATISTICAL QUALITY-CONTROL SYSTEM

Roger L. Merrill and William Hecox, Columbus, Ohio, assignors, by mesne assignments, to The Exact Weight Scale Company, Columbus, Ohio, a corporation of Ohio Application November 18, 1953, Serial No. 392,961

43 Claims. (Cl. 235—61)

Our invention relates to a statistical quality-control system. It has to do, more particularly, with such a control system which employs as a control factor, both an average value of a series of the articles which are subjected to the control system and a range of values of such series which are used in conjunction to effect precise statistical quality control.

In our co-pending application Serial No. 218,123 filed March 29, 1951, now Patent No. 2,688,459, we have disclosed a statistical quality-control system in the form of an averaging system, in conjunction with a measuring or checking system which checks a series of articles in regard to the measurable physical characteristic thereof that may vary from a norm and provides a voltage responsive to the value of said measurable characteristic for each article by translating the value of said characteristic into a voltage if the characteristic is not itself a voltage. The averaging system disclosed in said co-pending application determines the average value of the said measurable characteristic in a group or series of groups of articles, by translating the series of voltages produced by a predetermined number of succeeding articles into a composite voltage output, representing the average value of such articles, which can be used in controlling equipment that functions to bring the variable characteristic of succeeding articles being measured or checked back to the norm.

In our co-pending application Serial No. 233,588 filed June 26, 1951, now Patent No. 2,688,740, we have disclosed a statistical quality control system, in the form of a range computer, in conjunction with a measuring or checking system of the type indicated above. The range computer disclosed in said copending application receives the successive voltages from the measuring system and determines the range existent between the two voltages, produced by the two articles, in a series of predetermined number, having the greatest dissimilarity. This range computer not only determines the value of range, but compares it with an arbitrary range value, and translates such value into energy which can be measured and indicated so that such information can be used to determine if the equipment, which is imparting such value to the articles, is functioning properly.

In both of our said co-pending applications, the example given for the variable characteristic being measured is weight but as indicated therein, other characteristics can be measured.

According to the present invention, we have provided a statistical quality-control system which uses as a control factor, a voltage output that represents an average value of a group of a predetermined total number of articles of a series of articles being measured or checked in conjunction with a voltage output that represents the range of values of articles in each group of said predetermined total number or in conjunction with a voltage output that results from an average of ranges of a predetermined series of groups of articles, said series of groups comprising together said predetermined total number of articles.

The statistical quality-control system of our invention comprises a suitable unit for measuring or checking a series of articles in regard to a measurable physical characteristic thereof that may vary and for providing a voltage responsive to the value of said measurable physical characteristic for each article of a series to be measured or checked. Connected to the measuring or checking unit, to receive each of the voltages created thereby, as an input voltage, is an averaging unit for providing a first output voltage proportionate to the average of the input voltages supplied thereto by the measuring or checking unit, which input voltages result from a group of articles having a predetermined total number of articles. Also, connected to the measuring or checking unit is a range computer which will also receive the voltages, created by the measuring or checking unit from the said predetermined number of articles, as input voltages. This range computer will provide a second output voltage proportionate to the algebraic difference between the two input voltages received from said measuring or checking unit, as a result of said group of articles of predetermined number, having the greatest difference in algebraic value. However, the second output voltage may be provided by a range computer, through an averaging unit, which will receive each range-responsive voltage from the range computer and will supply an output voltage, proportionate to the average of the input voltages received from the range computer for a predetermined number of groups of the series of articles, said series of groups comprising together said predetermined total number of articles. Our device also includes an actuating unit connected to the first-mentioned averaging system to receive said first output voltage and connected either directly to the range computer or to the second averaging unit to receive said second output voltage and which includes means responsive to both of the output voltages to provide a control factor as a predetermined function of both of the output voltages. By using both average values and range-responsive values as indicated above, a very precise statistical quality-control system results.

In the drawings:

Figure 8 is a conventionalized perspective view, partially schematic, illustrating an additional form of actuating system for performing according to the operating requirements illustrated in Figure 3;

Figure 4:
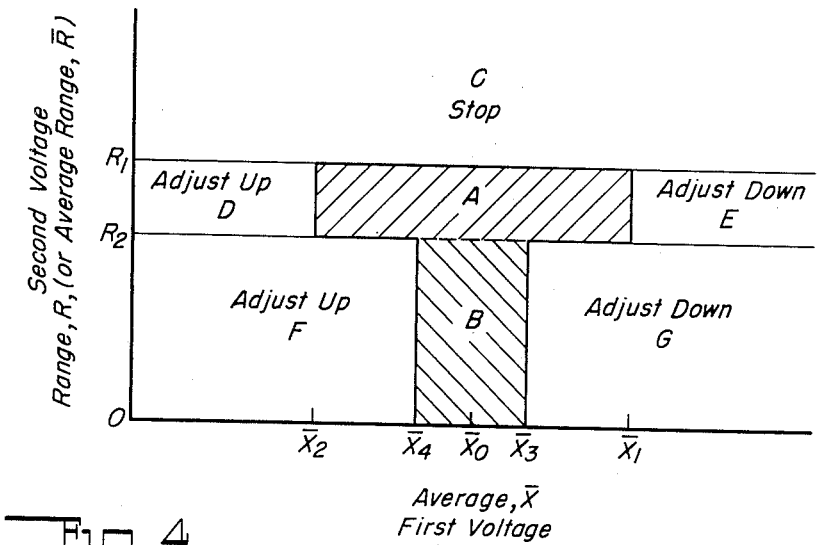
Figure 4 is a graph in rectangular coordinates useful in explaining the operation of statistical quality-control systems in accordance with the present invention, and illustrating other typical operating requirements of such systems.

Figure 9 is a conventionalized perspective view, partially schematic, illustrating an additional form of actuating system for performing according to the operating requirements illustrated in Figure 4; and Figure 10 is a conventionized perspective view, partially schematic, illustrating a modified form of actuating system, similar to that of Figure 9, capable of performing according to typical generalized operating requirements.

Statistical control systems

Figure 1:
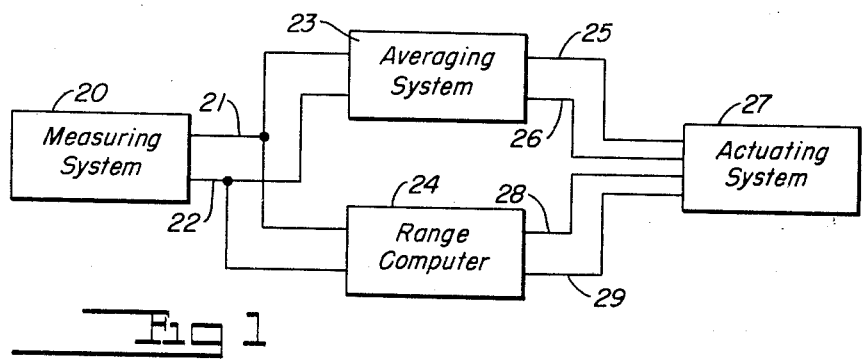
Figure 1 is a block diagram illustrating a statistical quality-control system according to the present invention.

Referring now to Figure 1, which illustrates in block-diagram form a typical statistical quality-control system according to the present invention, the measuring system 20 may comprise any suitable equipment for checking a series of articles in regard to a measurable physical characteristic thereof that may vary and for providing a voltage responsive to the value of said measurable characteristic for each article as by translating the value of said characteristic into a voltage if the characteristic is not itself a voltage. Where the characteristic to be measured is weight, the oscillator and discriminator circuit and associated weighing and keying equipment as shown and described in the aforementioned copending applications, Serial No. 218,123, Patent No. 2,688,459, and No. 233,588, Patent No. 2,688,740, may constitute the measuring system 20.

The voltage provided by the measuring system 20 is connected by means of the conductors 21 and 22 to an averaging system 23. The voltage provided by the measuring system 20 is connected by means of the conductors 21 and 22 to a range computer 24 also. The averaging system 23 preferably comprises equipment as shown and described in said co-pending application, Serial No. 218,123, Patent No. 2,688,459, or equivalent equipment, for providing, by means of the conductors 25 and 26 to the actuating system 27, a first output voltage proportionate to the average of the input voltages to the averaging system 23 from the measuring system 20 for a series of articles making up a group, or for a series of such groups of articles. The said first output voltage, provided by the averaging system 23 by means of the conductors 25 and 26 to the actuating system 27, provides a measure of the average value of the measurable physical characteristic for a predetermined number of articles.

The range computer 24 preferably comprises equipment as disclosed in the said co-pending application, Serial No. 233,588, or equivalent equipment, for receiving the input voltage from the conductors 21 and 22 and for providing by means of the conductors 28 and 29 to the actuating system 27, a second output voltage proportionate to the algebraic difference between the input voltages to the range computer 24 having the greatest difference in algebraic value for a group of voltages comprising a measure of said physical characteristic for a series of articles making up a group, or for a series of such groups of articles. The said second output voltage provided to the actuating system 27 by means of the conductors 28 and 29 from the range computer 24 comprises a measure of the difference in value of the measurable physical characteristic between the two articles, in a predetermined number of articles, having the greatest dissimilarity of said characteristic.

The actuating system 27 comprises equipment, hereinafter described in detail, responsive to the first output voltage and the said second output voltage for providing a control factor as a predetermined function of both said output voltages. While in a portion of a voltage range the control factor may be provided responsive to one said voltage, regardless of the value of the other said voltage, the forms of the actuating system 27 in accordance with the present invention are predominantly responsive to a predetermined function of both said voltages in which neither voltage is controlling by itself but only in combination with the other said voltage.

Figure 2:
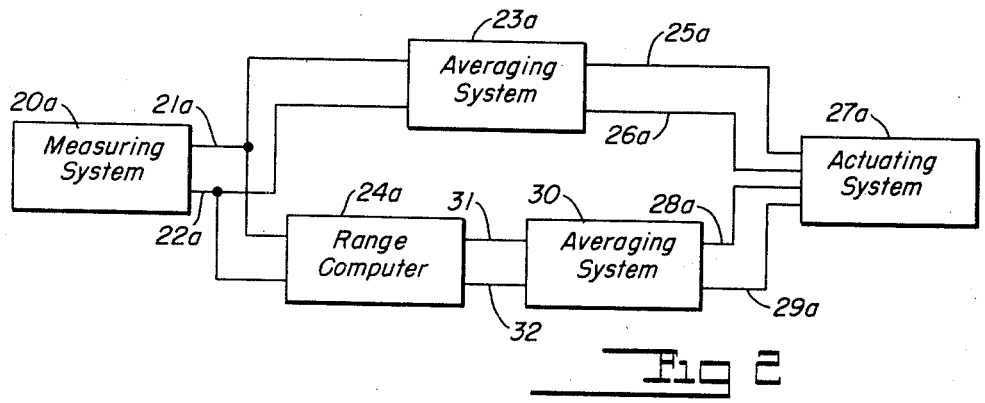
Figure 2 is a block diagram illustrating a modification of the system of Figure 1.

Figure 2 illustrates a modification of the statistical quality-control system of Figure 1. This modified system is nearly identical to that of Figure 1, and the components and connections designated 20a—29a are identical to the components and connections designated by corresponding reference numerals without subscripts in Figure 1. In the statistical quality-control system of Figure 2, a second averaging system 30, similar to the averaging system 23a, is connected between the range computer 24a and the actuating system 27a. The conductors 31 and 32 connect the output voltage of the range computer 24a to the averaging system 30, and the conductors 28a and 29a connect the output voltage of the averaging system 30 to the actuating system 27a, as the second voltage provided to the actuating system 27a.

The system of Figure 2 is particularly useful where a large number of articles, comprising a series of groups of articles, is to be checked for each control operation. The averaging system 23a provides, by means of the conductors 25a and 26a, to the actuating system 27, a first output voltage comprising a measure of the cumulative average value of the measurable physical characteristic for a series of groups of articles being checked. The range computer 24a provides, by means of the conductors 31, 32, to the averaging system 30, a range-responsive voltage for each group of articles, comprising a measure of the difference in value of the measured characteristic between the two articles in the group having the greatest dissimilarity of said characteristic; and the averaging system 30 provides, by means of the conductors 28a, 29a, to the actuating system 27a, a second output voltage proportionate to the average value of the input voltages supplied to the averaging system 30 for a series of said groups of articles. This second output voltage comprises a measure of the average value of the range of values of the measured characteristic for the series of groups of articles, or, more specifically, the average, for the series of groups, of the difference in value of the measured characteristic between the two articles in each group having the greatest dissimilarity in the value of the said characteristic.

In the statistical quality-control system of Figure 1, the first voltage supplied to the actuating system 27 is a measure of the average value $\overline{X}$ for a predetermined number of articles, and the second voltage supplied to the actuating system 27 is a measure of the range of values R of a measured characteristic for the same predetermined number of articles. In the statistical quality-control system of Figure 2, the first voltage supplied to the actuating system 27a is a measure of the average value $\overline{X}$, as in the system of Figure 1, and the second voltage is a measure of the average range $\overline{R}$ of the measured characteristic for a series of groups of articles, together comprising the same predetermined total number of articles. For convenience, most of the description herein is made in terms of a system as illustrated in Figure 1, wherein the average $\overline{X}$ and the range R are represented by the first voltage and the second voltage applied to the actuating system 27, but it is to be understood, of course, that the actuating system and its operation can be similarly described in terms of the average $\overline{X}$ and the average range $\overline{R}$ as in the averaging system 27a of Figure 2. The actuating system and its operation may be the same in either quality-control system.

Accept-reject control

A typical quality-control situation, for which a statistical quality-control system according to this invention is applicable, is one in which it is desired to accept or reject a group or lot of articles on the basis of measurements of a particular physical characteristic, such as weight, made on a predetermined number of said articles, which may comprise the entire lot or a representative sample from the lot.

The criteria for accepting or rejecting the lot might logically be set up according to the following plan.

I. Reject the lot under any of the three following conditions:

*Condition 1.*—If the range R exceeds a predetermined value R1.

*Condition 2.*—If the average $\overline{X}$ is greater than a predetermined value $\overline{X}1$ or is less than predetermined value $\overline{X}2$.

*Condition 3.*—If the range R is less than a predetermined value R2 and the average $\overline{X}$ is greater than a predetermined value $\overline{X}3$ or is less than a predetermined value $\overline{X}4$.

II. Accept the lot if the values of the average $\overline{X}$ and the range R are not such as to meet one of the conditions 1, 2, or 3.

Figure 3:
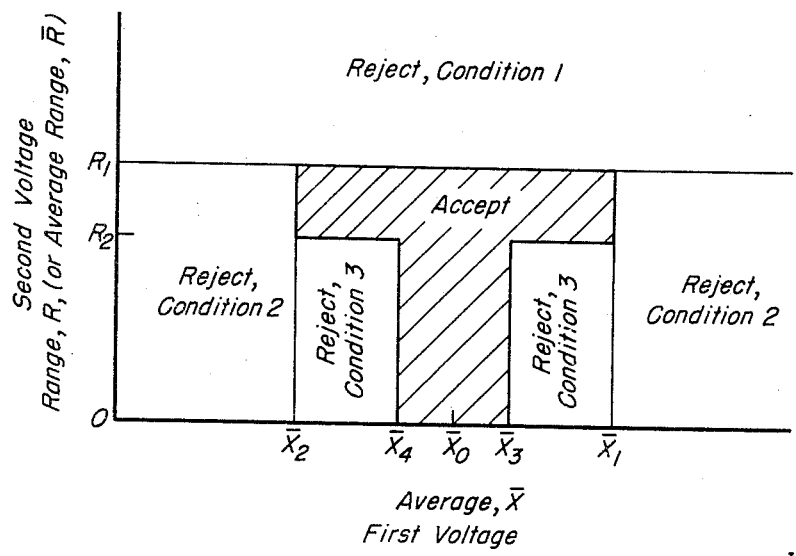
Figure 3 is a graph in rectangular coordinates illustrating typical operating requirements for a statistical quality-control system in accordance with the present invention.

In Figure 3 the statistical quality-control requirements described above are illustrated graphically. In the graph of Figure 3, which is plotted in rectangular coordinates, the first voltage, representing the average $\overline{X}$, is plotted along the horizontal axis and the second voltage, representing the range R (or average range $\overline{R}$), is plotted along the vertical axis. $\overline{X}0$ represents the desired average, while $\overline{X}1$, $\overline{X}2$, $\overline{X}3$, $\overline{X}4$, R1, and R2 represent the values described above.

Either the measuring system 20 should be such as to provide an output voltage that is always of a given polarity, or else the averaging system 23 should include a predetermined series voltage in its output circuit such that the said first voltage applied by the averaging system 23 to the actuating system 27 is always of the same polarity in accordance with Figure 3. The actuating system circuits could be modified in obvious ways to function properly in a statistical quality control system in which the desired average $\overline{X}0$ was represented by zero voltage, with the average values $\overline{X}1$ and $\overline{X}3$ represented by voltages of one polarity; and the average values $\overline{X}2$ and $\overline{X}4$ represented by voltages of opposite polarity, but for convenience the actuating system circuits of this invention are illustrated and described herein only for single polarity output voltages from the averaging system 23, as represented in the graph of Figure 3.

In Figure 3, the T-shaped shaded area labeled "Accept" represents the condition for acceptance of a lot of articles, while the areas labeled "Condition 1," "Condition 2," and "Condition 3" represent the conditions under which the lot is to be rejected. Figure 4 is a graph of the same type as Figure 3. In fact, it is identical to Figure 3 except for the manner in which the reject area is divided and labeled for purposes of further explanation, and except for some additional labeling applicable to a modified form of the actuating system.

Figure 5:
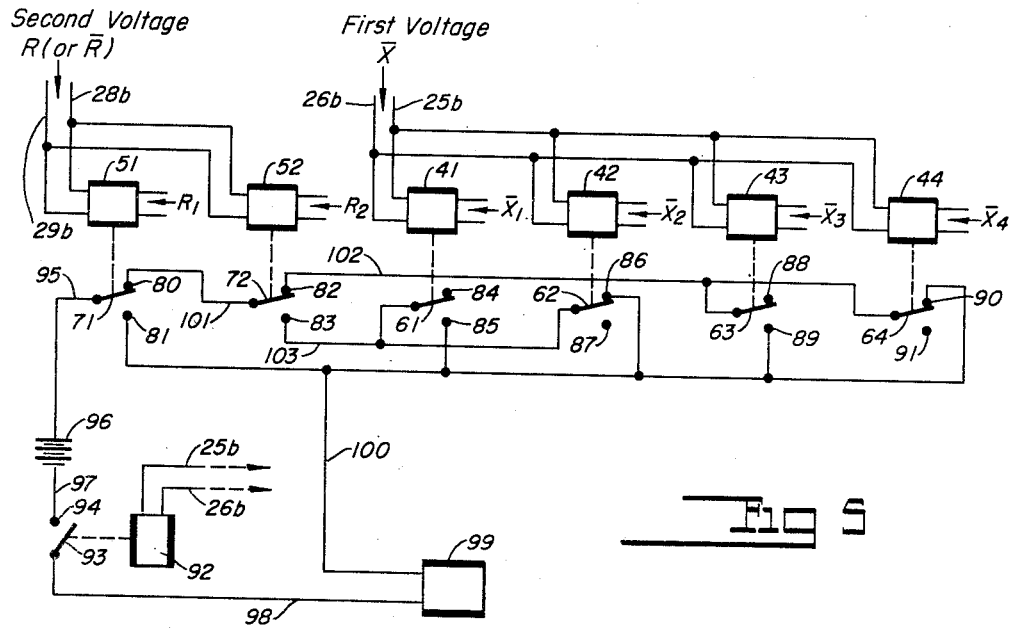
Figure 5 is a schematic diagram illustrating an actuating system for performing according to the operating requirements illustrated in Figure 3.

Figure 5 illustrates an actuating system for performing the functions required to accept or reject a series of articles in accordance with the statistical quality-control plan set forth above and illustrated in Figure 3. A first voltage $\overline{X}$ which may provide a measure of the average value of the measurable physical characteristic to be checked for a predetermined number of articles, is connected by means of the conductors 25b and 26b to the variable input voltage terminals of each of four differential relays 41, 42, 43, and 44 connected in parallel. A predetermined voltage X1 corresponding to the average value $\overline{X}1$ in the control plan described above and in the graphs of Figure 3 and Figure 4, is connected to the comparison voltage terminals of the differentail relay 41. Similarly, voltages $\overline{X}2$, $\overline{X}3$, and $\overline{X}4$ corresponding respectively to the values $\overline{X}2$, $\overline{X}3$, and $\overline{X}4$, in the statistical control plan in the graphs of Figure 3 and Figure 4 are connected across the comparison voltage terminals of the differential relays 42, 43, and 44, respectively.

A second voltage R (or $\overline{R}$) comprising a measure of the range, or difference in value of the measurable characteristic between the two articles having the greatest dissimilarity of the characteristic in the series of articles, or comprising a measure of the average value of the range of values of the measured characteristic for a series of groups of articles, is connected by means of the conductors 28b and 29b to the variable input voltage terminals of two differential relays 51 and 52 connected in parallel. For convenience, in the remainder of the discussion of the actuating system of Figure 5, it will be assumed that the second voltage comprises a measure of the range R. A predetermined voltage R1, corresponding to the range value R1 in the above statistical quality-control plan and in the graphs of Figure 3 and Figure 4, is connected to the comparison voltage terminals of the differential relay 51, and a predetermined voltage R2, corresponding to the range value R2 in the above statistical quality-control plan and in the graphs of Figure 3 and Figure 4, is connected to the comparison voltage terminals of the differential relay 52.

The differential relays 41, 42, 43, 44, 51, and 52 are of the type well known in the art in which actuation of the contact arm operatively associated therewith is provided only when the variable input voltage is greater than the comparison voltage applied thereto. If desired, a circuit providing equivalent operation may be substituted for any or all of the differential relays. One such circuit is illustrated in Figure 6 as an alternative form of the circuit for operation of the differential relay 51.

Figure 6:
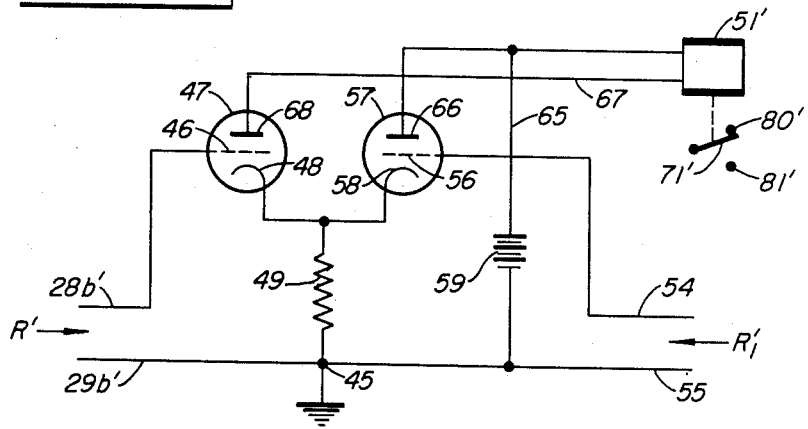
Figure 6 is a schematic diagram illustrating an alternative form of component that may be used in portions of the circuits of Figure 5 and Figure 7.

In the circuit of Figure 6, a second voltage R', comprising a range measurement voltage, is connected by means of the conductors 28b' and 29b' from the ground terminal 45 of the circuit to the grid 46 of a first triode 47. The cathode 48 of the triode 47 is connected to one end of a cathode bias resistor 49, and the other end of the resistor 49 is connected to the ground terminal 45. A voltage R'1, corresponding to the range R1 in the above statistical quality-control plan and in the graphs of Figure 3 and Figure 4, is connected by means of the conductors 54 and 55 from the ground terminal 45 of the circuit to the grid 56 of a second triode 57, the cathode 58 of which is connected to the cathode 48 of the first triode 47. The negative terminal of a battery or other suitable direct voltage source 59 is connected by means of the conductor 55 to the ground terminal 45, and the positive terminal of the voltage source 59 is connected by means of a conductor 65 to the plate 66 of the second triode 57 and to one terminal of a conventional type relay 51'. The other terminal of the relay 51' is connected by means of a conductor 67 to the plate 68 of the first triode 47. Operatively associated with the relay 51' is a contact arm 71' which remains in the upper position in contact with the contact point 80', as shown in Figure 6, when the relay 51' is not energized, and is moved to a lower position contacting the contact point 81' when the relay 51' is energized.

The circuit of the second triode 57 with the plate voltage source 59, the comparison range voltage R'1 applied to the grid 56, and the cathode resistor 49, serves as a cathode follower-type circuit in which the voltage across the cathode resistor 49 "follows," or varies in the same direction as, the grid voltage R'1. Since the cathode 48 of the first triode 47 is connected to the cathode resistor 49 also, this voltage serves as a bias voltage between the cathode 48 and the grid 46 of the first triode 47, and thereby determines the amount of voltage R' that is necessary to provide sufficient plate current in the first triode 47 to energize the relay 51', which is connected between the voltage source 59 and the plate 68 of the first triode 47. The amount of voltage R' required to energize the relay 51' increases or decreases correspondingly as the voltage R'1 increases or decreases, and the voltage R'1 can be set at a value corresponding to the range value R1 in the above control plan and in the graphs of Figure 3 and Figure 4, so that the relay 51' will be energized only when the voltage R' exceeds the voltage corresponding to the range value R1. This does not necessarily mean that the voltage necessary to energize the relay 51' is equal to the voltage R'1, but merely that the voltage R'1 can be adjusted to provide the proper corresponding value of the voltage R' corresponding to the range value R1 above which the relay 51' will be actuated. Similarly, the comparison voltages R1, R2, $\overline{X}$1, $\overline{X}$2, $\overline{X}$3, and $\overline{X}$4 connected to the differential relays 51, 52, 41, 42, 43, and 44, respectively, may be but are not necessarily equal to the corresponding voltages required to operate these respective differential relays, but merely determine the amount of voltage that must be present across the variable input voltage terminals of the respective differential relays necessary for the operation thereof. For convenience in the discussion herein of circuits including differential relays, the comparison voltages are considered to be equal to the respective measured voltages corresponding to the predetermined values of average, range, or average range to which the differential relay is intended to be responsive.

Referring again to Figure 5, the differential relay 51 is operatively connected to, and controls the position of, a contact arm 71, which remains in an upper position, as shown, contacting an upper contact point 80, as long as the voltage R does not exceed the voltage R1, and which is moved to its lower position contacting the lower contact point 81, when the differential relay 51 is actuated by virtue of the presence of an input voltage R that is greater than the comparison voltage R1. The differential relay 52 is operatively connected to, and controls the position of, a contact arm 72, which remains in an upper position, as shown, contacting an upper contact point 82, as long as the voltage R does not exceed the voltage R2, and which is moved to its lower position contacting the lower contact point 83, when the differential relay 52 is actuated by virtue of the presence of an input voltage R that is greater than the comparison voltage R2. The differential relay 41 is operatively connected to, and controls the position of, a contact arm 61, which remains in an upper position, as shown, contacting an upper contact point 84 as long as the voltage $\overline{X}$ does not exceed the voltage $\overline{X}$1, and which is moved to its lower position contacting the lower contact point 85, when the differential relay 41 is actuated by virtue of the presence of an input voltage $\overline{X}$ that is greater than the comparison voltage $\overline{X}$1. The differential relay 42 is operatively connected to, and controls the position of, a contact arm 62, which remains in an upper position, as shown, contacting an upper contact point 86, as long as the voltage $\overline{X}$ does not exceed the voltage $\overline{X}$2, and which is moved to its lower position contacting the lower contact point 87, when the differential relay 42 is actuated by virtue of the presence of an input voltage $\overline{X}$ that is greater than the comparison voltage $\overline{X}$2. The differential relay 43 is operatively connected to, and controls the position of, a contact arm 63, which remains in an upper position, as shown, contacting an upper contact point 88, as long as the voltage $\overline{X}$ does not exceed the voltage $\overline{X}$3, and which is moved to its lower position contacting the lower contact point 89, when the differential relay 43 is actuated by virtue of the presence of an input voltage $\overline{X}$ that is greater than the comparison voltage $\overline{X}$3. The differential relay 44 is operatively connected to, and controls the position of, a contact arm 64, which remains in an upper position, as shown, contacting an upper contact point 90, as long as the voltage $\overline{X}$ does not exceed the voltage $\overline{X}$4, and which is moved to its lower position contacting the lower contact point 91, when the differential relay 44 is actuated by virtue of the presence of an input voltage $\overline{X}$ that is greater than the comparison voltage $\overline{X}$4.

A conventional type relay 92 is connected in the circuit in such manner as to be energized whenever a first voltage $\overline{X}$ is applied to the actuating system. For convenience, the relay 92 in Figure 5 and the corresponding relays 92a, 92b, 92c, and 92d in Figures 7, 8, 9 and 10 are shown as connected directly to the conductors 25b, 26b; 25c, 26c; 25d, 26d; 25e, 26e; and 25f, 26f, respectively. It may be desirable, however, to avoid loading the first voltage $\overline{X}$, by energizing the relay 92, 92a, etc. in a different manner as through a simple isolating circuit having a substantially infinite input impedance as in the grid circuit of a conventional vacuum tube, or in other obvious ways. The relay 92 is operatively connected with, and controls the position of, a contact arm 93, which remains in the open-circuit position shown in Figure 5, when the relay 92 is not energized, and which contacts a contact point 94, when the relay 92 is energized. The contact arm 71, controlled by the differential relay 51, is connected by means of a conductor 95 to one terminal of a battery or other suitable source of direct voltage 96, the other terminal of which is connected by a conductor 97 to the contact point 94. The contact arm 93, controlled by the conventional type relay 92, is connected by a conductor 98 to one terminal of a conventional type relay 99 which, when energized, serves as a reject actuator by providing the switching necessary to actuate a rejecting device (not shown) which may be of a type well known in the art for rejecting the group or lot of articles to be rejected. The other terminal of the reject actuator relay 99 is connected by means of a conductor 100 to the lower contact point 81, associated with the contact arm 71, to the lower contact point 85 associated with the contact arm 61, to the upper contact point 86, associated with the contact arm 62, to the lower contact point 89, associated with the contact arm 63, and to the upper contact point 90, associated with the contact arm 64. A conductor 101 connects the upper contact point 80, associated with the contact arm 71, to the contact arm 72. A conductor 102 connects the upper contact point 82, associated with the contact arm 72, to the contact arm 63 and to the contact arm 64. A conductor 103 connects the lower contact point 83, associated with the contact arm 72, to the contact arm 61 and to the contact arm 62. The upper contact point 84, associated with the contact arm 61, the lower contact point 87, associated with the contact arm 62, the upper contact point 88, associated with the contact arm 63, and the lower contact point 91, associated with the contact arm 64, are all left floating.

The actuating system of Figure 5 operates in the following manner:

As long as the conventional relay 92 remains unenergized, the contact arm 93 controlled thereby remains in the open-circuit position shown in Figure 5. When the predetermined number of articles has been checked, the averaging system 23 and the range computer 24 (Figure 1) simultaneously provide to the actuating system 27 a first voltage $\overline{X}$ and a second voltage R. The first voltage $\overline{X}$ is supplied across the conductors 25b and 26b, and the second voltage R is supplied across the conductors 28b and 29b. The first voltage $\overline{X}$ is connected by means of the conductors 25b and 26b to the relay 92, energizing the relay 92 and causing the contact arm 93 to make contact with the contact point 94, and thereby to connect one terminal of the reject actuator relay 99 to one terminal of the D. C. voltage source 96 by way of the conductor 98, the contact arm 93, the contact point 94, and the conductor 97. The reject actuator relay 99 is not energized, however, unless a conducting path is provided, through relay arm 71 and point 81, between the conductor 95, connected to the other terminal of the D. C. voltage source 96, and the conductor 100, connected to the other terminal of the reject actuator relay 99.

Referring now to Figure 4, as well as to Figure 5, it is desired to reject the group or lot of articles in the event that the second voltage R, providing a measure of the range or of the average range, exceeds the comparison voltage value R1, regardless of the magnitude of the first voltage, providing a measure of the average. This condition is represented by the area labeled C in the graph of Figure 4. When the second voltage R, connected by the conductors 28b, 29b to the differential relay 51, is greater than the comparison voltage R1, connected to the comparison voltage terminals of the differential relay 51, the contact arm 71 is moved to the downward position contacting the lower contact point 81 associated therewith and providing a connection between the conductor 95 and the conductor 100 and thereby completing the circuit between the voltage source 96 and the reject actuator relay 99, energizing the reject actuator relay 99. Thus, the group or lot of articles is rejected in accordance with the statistical quality control plan described above and illustrated in the graph of Figure 4, regardless of the magnitude of the first voltage $\bar{X}$.

If the second voltage R is greater than the comparison voltage R2 but less than R1, and the first voltage $\bar{X}$ is less than $\bar{X}2$, it is also desired that the group or lot of articles be rejected. This condition is represented by the area labeled D in the graph of Figure 4. For this condition, the contact arms 71, 61, 62, 63, and 64 all remain in the upper positions, as shown in Figure 5, but since the second voltage R is greater than the comparison voltage R2, the differential relay 52 causes the contact arm 72, controlled thereby, to move to its downward position contacting the contact point 83. A conducting path is thereby provided from the conductor 95 through the contact arm 71, the contact point 80, the conductor 101, the contact arm 72, the contact point 83, the conductor 103, the contact arm 62, the contact point 86, and the conductor 100, to the reject actuator relay 99. The circuit is completed, therefore, between the voltage source 96 and the reject actuator relay 99, energizing the reject actuator 99 and causing the group or lot of articles to be rejected in accordance with the predetermined plan.

It will be noted that the conducting path described is the only one present under the foregoing described conditions between the conductors 95 and 100. When the second voltage R has a value greater than R2 and less than R1, as in the preceding condition, but the first voltage $\bar{X}$ has a value greater than $\bar{X}2$ and less than $\bar{X}1$, this path is broken. The differential relay 42 is actuated by virtue of the fact that the voltage $\bar{X}$ is greater than the comparison voltage $\bar{X}2$ and the contact arm 62 is caused to move to its downward position, contacting the floating contact point 87 and breaking the circuit between the conductor 95 and the conductor 100. It is immaterial whether the first voltage $\bar{X}$ is greater or less than $\bar{X}3$ or $\bar{X}4$, respectively, because the differential relays 43 and 44, whose action is related to these values, cannot possibly cause the circuit to be completed. The reason for this is that the contact arm 72, controlled by the differential relay 52, is in the downward position contacting the contact point 83, and under this condition the conductor 102 and the contact arms 63 and 64, controlled by the differential relays 43 and 44, respectively, are not connected to anything else, so it is immaterial which positions the contact arms 63 and 64 are in. Under the condition in which the second voltage R is greater than R2 and less than R1, and the first voltage $\bar{X}$ is greater than $\bar{X}2$ and less than $\bar{X}1$, the condition represented by the area labeled A in the graph of Figure 4, the reject actuator relay 99 is not actuated. The group or lot of articles is accepted, therefore, in accordance with the predetermined plan.

When the second voltage R is greater than R2 and less than R1 and the first voltage $\bar{X}$ is greater than $\bar{X}1$, the conductor 95 is connected to the conductor 100 through the contact arm 71, which is in the upward position contacting the contact point 80, the conductor 101, the contact arm 72, which is in the downward position contacting the contact point 83, the conductor 103, the contact arm 61, which is in the downward position contacting the contact point 85 connected to the conductor 100. The contact arm 61 is in the downward position because of the fact that the first voltage $\bar{X}$ is greater than the comparison voltage $\bar{X}1$ applied to the differential relay 41, and the relay 41 is thereby actuated to move the contact arm 61 to its downward position. Thus, the reject actuator 99 is energized, causing the group or lot of articles to be rejected in accordance with the predetermined plan. This condition is represented by the area E in the graph of Figure 4.

When the second voltage R is less than R2, both the contact arm 71, controlled by the differential relay 51, and the contact arm 72, controlled by the differential relay 52, remain in their upper positions, as shown in Figure 5, and the contact arm 61, controlled by the differential relay 41, and the contact arm 62, controlled by the differential relay 42, cannot complete a path between the conductor 95 and the conductor 100 because these contact arms are connected only to the conductor 103, which, under this condition, is not connected to anything else. The operation of the actuating system, when the second voltage R is less than R2, therefore, is not affected by any relationship between the first voltage $\bar{X}$ and the values $\bar{X}1$ and $\bar{X}2$. The operation of the actuating system circuit is affected, however, by the relationship between the first voltage $\bar{X}$ and the voltages $\bar{X}3$ and $\bar{X}4$. If the first voltage $\bar{X}$ is less than $\bar{X}4$, in accordance with the condition represented by the area labeled F in the graph of Figure 4, then a conducting path is completed from the conductor 95 through the contact arm 71, the contact point 80, the conductor 101, the contact arm 72, the contact point 82, the conductor 102, the contact arm 64, which is in its upper position as shown in Figure 5 by virtue of the fact that the first voltage $\bar{X}$ is less than the comparison voltage $\bar{X}4$ applied to the differential relay 44, and the contact point 90, which is in contact with the contact arm 64, to the conductor 100. The circuit between the voltage source 96 and the reject actuator relay 99 is completed, energizing the reject actuator relay 99 and causing the group or lot of articles to be rejected in accordance with the predetermined plan.

When the first voltage $\bar{X}$ is greater than $\bar{X}4$ but less than $\bar{X}3$, the conducting path between the conductor 95 and the conductor 100, including the conductor 102, which is the only path between these two conductors under the condition in which the second voltage R is less than R2, is broken, because the contact arm 64 is moved to its downward position contacting the floating contact point 91, by virtue of the fact that the first voltage $\bar{X}$ is greater than the comparison voltage $\bar{X}4$ applied to the differential relay 44. The reject actuator relay 99, therefore, remains unenergized and the group or lot of articles is accepted in accordance with the predetermined plan. The foregoing condition is represented by the area labeled "B" in the graph of Figure 4.

When the first voltage $\bar{X}$ is greater than $\bar{X}3$, with the second voltage R less than R2, as represented by the area labeled "G" in the graph of Figure 4, a conducting path is completed between the conductor 95 and the conductor 100, through the contact arm 71, the contact point 80, the conductor 101, the contact arm 72, the contact point 82, the conductor 102, and the contact arm 63, which is in its downward position contacting the contact point 89 connected to the conductor 100. The contact arm 63 is in its downward position by virtue of the fact that the first voltage $\bar{X}$ is greater than the comparison voltage $\bar{X}3$ applied to the differential relay 43. Thus, the circuit is completed between the voltage source 96 and the reject actuator relay 99, so as to energize the relay 99 and to cause the group or lot of articles to be rejected in accordance with the predetermined plan.

To summarize, the reject actuator relay 99 remains unenergized, and the group or lot of articles is accepted, under the conditions represented by the areas labeled A and B in the graph of Figure 4; while the reject actuator relay 99 is energized, and the group or lot of articles is rejected under the conditions represented by the areas labeled C, D, E, F, and G in the graph of Figure 4. Thus, the actuating system circuit of Figure 5 provides the required operations as described above, and as illustrated also in Figure 3.

*Adjust-or-stop control*

Another typical quality control situation for which a statistical quality control system according to this invention is applicable is one in which it is desired to stop the process involved, or to make upward or downward adjustment in the process where necessary, on the basis of measurements of a particular physical characteristic, such as weight, made on a predetermined number of said articles, which may comprise the entire lot or a representative sample from the lot.

The criteria for adjusting or stopping the process might logically be set up according to the following plan.

*Condition A.*—Make no adjustment if the range R is greater than R2 and less than R1 and the average $\overline{X}$ is greater than $\overline{X}2$ and less than $\overline{X}1$. This condition is represented by the area labeled A in the graph of Figure 4.

*Condition B.*—Make no adjustment if the range R is less than R2 and the average $\overline{X}$ is greater than $\overline{X}4$ and less than $\overline{X}3$. This condition is represented by the area labeled B in the graph of Figure 4.

*Condition C.*—Stop the process if the range R is greater than R1. This condition is represented by the area labeled C in the graph of Figure 4.

*Condition D.*—Adjust the process upward if the range R is greater than R2 and less than R1 and the average $\overline{X}$ is less than $\overline{X}2$. This condition is represented by the area labeled D in the graph of Figure 4.

*Condition E.*—Adjust the process downward if the range R is greater than R2 and less than R1 and the average $\overline{X}$ is greater than $\overline{X}1$. This condition is represented by the area labeled E in the graph of Figure 4.

*Condition F.*—Adjust the process upward if the range R is less than R2 and the average $\overline{X}$ is less than $\overline{X}4$. This condition is represented by the area labeled F in the graph of Figure 4.

*Condition G.*—Adjust the process downward if the range R is less than R2 and the average $\overline{X}$ is greater than $\overline{X}3$. This condition is represented by the area labeled G in the graph of Figure 4.

Figure 7:
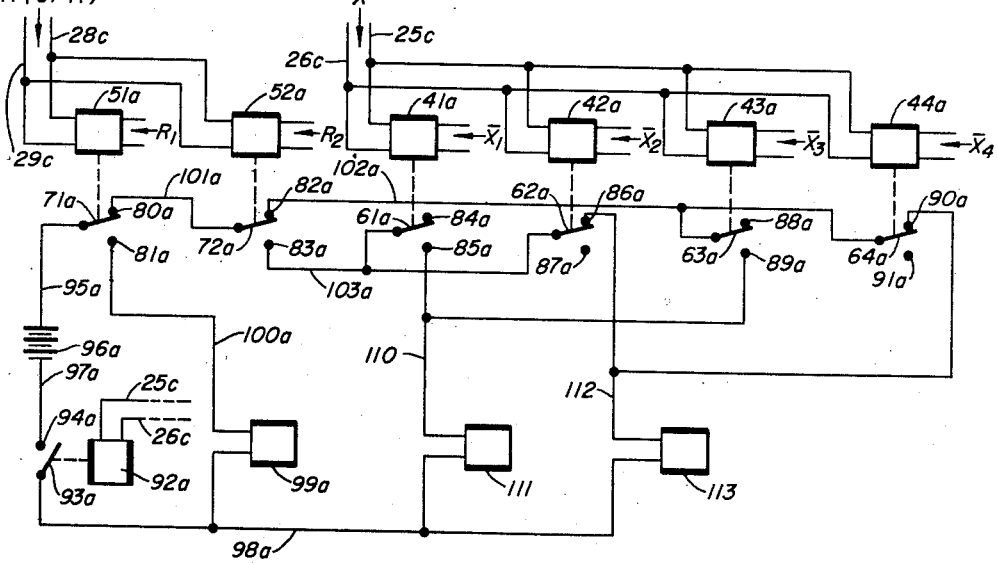
Figure 7 is a schematic diagram illustrating an actuating system for performing according to the operating requirements illustrated in Figure 4.

Figure 7 illustrates an actuating system for performing the functions required in accordance with the statistical quality control plan set forth above and illustrated in Figure 4. The first voltage $\overline{X}$, which may provide a measure of the average value of the measurable physical characteristic to be checked for a predetermined number of articles, is connected by means of the conductors 25c and 26c, to the variable input voltage terminals of each of four differential relays 41a, 42a, 43a, and 44a, connected in parallel. A predetermined voltage $\overline{X}1$, corresponding to the average value $\overline{X}1$ in the control plan described above and in the graph of Figure 4, is connected to the comparison voltage terminals of the differential relay 41a. Similarly, voltages $\overline{X}2$, $\overline{X}3$, and $\overline{X}4$, corresponding respectively to the values $\overline{X}2$, $\overline{X}3$, and $\overline{X}4$ in the statistical control plan represented in the graph of Figure 4, are connected across the comparison voltage terminals of the differential relays 42a, 43a, and 44a, respectively.

A second voltage R (or $\overline{R}$) comprising a measure of the range, or difference in value of the measurable characteristic between the two articles having the greatest dissimilarity of the characteristic in the series of articles, or comprising a measure of the average value of the range of values of the measured characteristic for a series of groups of articles, is connected by means of the conductors 28c, 29c to the variable input voltage terminals of two differential relays 51a and 52a, connected in parallel. For convenience in the remainder of the discussion of the actuating system of Figure 7, it will be assumed that the second voltage comprises a measure of the range R. A predetermined voltage R1, corresponding to the range value R1 in the above statistical quality-control plan and in the graph of Figure 4, is connected to the comparison voltage terminals of the differential relay 51a and a predetermined voltage R2, corresponding to the range value R2 in the above statistical quality-control plan and in the graph of Figure 4, is connected to the comparison voltage terminals of the differential relay 52a. The differential relays 41a, 42a, 43a, 44a, 51a, and 52a, are of the type well known in the art, in which actuation of the contact arm operatively associated therewith is provided only when the variable input voltage is greater than the comparison voltage applied thereto; or if desired a circuit providing equivalent operation such as the circuit of Figure 6, may be substituted for any or all of the differential relays.

The differential relay 51a is operatively connected to, and controls the position of, a contact arm 71a, which remains in an upper position, as shown, contacting an upper contact point 80a as long as the voltage R does not exceed the voltage R1, and which is moved to its lower position, contacting at a lower contact point 81a when the differential relay is actuated by virtue of the presence of an input voltage R that is greater than the comparison voltage R1. The differential relay 52a is operatively connected to, and controls the position of, a contact arm 72a, which remains in an upper position, as shown, contacting an upper contact point 82a as long as the voltage R does not exceed the voltage R2, and which is moved to its lower position, contacting the lower contact point 83a, when the differential relay 52a is actuated by virtue of the presence of an input voltage R that is greater than the comparison voltage R2.

The differential relay 41a is operatively connected to, and controls the position of, a contact arm 61a, which remains in an upper position, as shown, contacting an upper contact point 84a as long as the voltage $\overline{X}$ does not exceed the voltage $\overline{X}1$, and which is moved to its lower position, contacting the lower contact point 85a, when the differential relay 41a is actuated by virtue of the presence of an input voltage $\overline{X}$ that is greater than the comparison voltage $\overline{X}1$. The differential relay 42a is operatively connected to, and controls the position of, a contact arm 62a, which remains in an upper position, as shown, contacting an upper contact point 86a as long as the voltage $\overline{X}$ does not exceed the voltage $\overline{X}2$, and which is moved to its lower position, contacting the lower contact point 87a, when the differential relay 42a is actuated by virtue of the presence of an input voltage $\overline{X}$ that is greater than the comparison voltage $\overline{X}2$. The differential relay 43a is operatively connected to, and controls the position of, a contact arm 63a, which remains in an upper position, as shown, contacting an upper contact point 88a, as long as the voltage $\overline{X}$ does not exceed the voltage $\overline{X}3$ and which is moved to its lower position, contacting the lower contact point 89a, when the differential relay 43a is actuated by virtue of the presence of an input voltage $\overline{X}$ that is greater than the comparison voltage $\overline{X}3$. The differential relay 44a is operatively connected to, and controls the position of, a contact arm 64a, which remains in an upper position, as shown, contacting an upper contact point 90a, as long as the voltage $\overline{X}$ does not exceed the voltage $\overline{X}4$ and which is moved to its lower position, contacting the lower contact point 91a, when the differential relay 44 is actuated by virtue of the presence of an input voltage $\overline{X}$ that is greater than the comparison voltage $\overline{X}4$.

A conventional type relay 92a is connected in the circuit in such manner as to be energized whenever a first voltage $\overline{X}$ is applied to the actuating system, as by connection to the conductors 25c, 26c. The relay 92a is operatively connected to, and controls the position of, a contact arm 93a, which remains in the open-circuit position as shown in Figure 7, when the relay 92a is not energized, and which contacts a contact point 94a, when the relay 92a is energized. The contact arm 71a, controlled by the differential relay 51a, is connected by means of a conductor 95a to one terminal of a battery or other suitable source of direct voltage 96a, the other terminal of which is connected by a conductor 97a to the contact point 94a. The contact arm 93a, controlled by the conventional type relay 92a, is connected by a conductor 98a to one terminal of a conventional type relay 99, which, when energized, serves as a stop-process actuator by providing the switching necessary to actuate a shut-down device (not shown) which may be of a type well known in the art for stopping the process involved, as by stopping the operation of the conveyor belts and filling equipment in a package-filling process. The other terminal of the stop-process actuator relay 99a is connected by means of a conductor 100a to the lower contact point 81a associated with the contact arm 71a.

A conductor 101a connects the upper contact point 80a, associated with the contact arm 71a, to the contact arm 72a. A conductor 102a connects the upper contact point 82a, associated with the contact arm 72a, to the contact arm 63a and to the contact arm 64a. A conductor 103a connects the lower contact point 83a, associated with the contact arm 72a, to the contact arm 61a and to the contact arm 62a. The lower contact point 85a, associated with the contact arm 61a, and the lower contact point 89a, associated with the contact arm 63a, are connected by means of a conductor 110 to one terminal of a conventional type relay 111, which, when energized, serves as an adjust-down actuator by providing the switching necessary to actuate an adjusting device (not shown) which may be of a type well known in the art for providing a downward compensating adjustment in the process, as by reducing the opening in the filling equipment used in a package-filling process. The other terminal of the adjust-down actuator relay 111 is connected to the conductor 98a. The upper contact point 86a, associated with the contact arm 62a and the upper contact point 90a, associated with the contact arm 64a, are connected by means of a conductor 112 to one terminal of a conventional type relay 113 which, when energized, serves as an adjust-up actuator by providing the switching necessary to actuate an adjusting device (not shown) which may be of a type well known in the art for providing a compensating upward adjustment in the process, as by increasing the opening in the filling equipment used in a package-filling process. The other terminal of the adjust-up actuator relay 113 is connected to the conductor 98a. The upper contact point 84a, associated with the contact arm 61a, the lower contact point 87a, associated with the contact arm 62a, the upper contact point 88a, associated with the contact arm 63a, and the lower contact point 91a, associated with the contact arm 64a, are all left floating.

The actuating system of Figure 7 operates in the following manner:

As long as the conventional relay 92a remains unenergized, the contact arm 93a controlled thereby remains in the open-circuit position shown in Figure 7. When the predetermined number of articles has been checked, the averaging system 23 and the range computer 24 (Figure 1) simultaneously provide to the actuating system 27 the first voltage $\overline{X}$ and a second voltage R. The first voltage $\overline{X}$ is supplied across the conductors 25c and 26c, and the second voltage R is supplied across the conductors 28c and 29c. The first voltage $\overline{X}$ is connected by means of the conductors 25c and 26c to the relay 92a, energizing the relay 92a and causing the contact arm 93a to make contact with the contact point 94a, and thereby to connect one terminal of the stop-process actuator relay 99a, one terminal of the adjust-down actuator relay 111, and one terminal of the adjust-up actuator relay 113, to one terminal of the D. C. voltage source 96a by way of the conductor 98a, the contact arm 93a, the contact point 94a, and the conductor 97a. The stop-process actuator relay 99a is not energized, however, unless a conducting path is provided between the conductor 95a, connected to the other terminal of the D. C. voltage source 96a and the conductor 100a, connected to the other terminal of the stop-process actuator relay 99a. The adjust-down actuator relay 111 is not energized unless a conducting path is provided between the conductor 95a, connected to the other terminal of the D. C. voltage source 96a, and the conductor 110, connected to the other terminal of the adjust-down actuator relay 111. The adjust-up actuator relay 113 is not energized unless a conducting path is provided between the conductor 95a, connected to the other terminal of the D. C. voltage source 96a, and the conductor 112, connected to the other terminal of the adjust-up actuator relay 113.

The circuit of Figure 7 is such that not more than one of the actuator relays 99a, 111, 113 can be energized at any given time.

Referring now to Figure 4, as well as to Figure 7, it is desired to stop the process in the event that the second voltage R, providing a measure of the range or of the average range, exceeds the comparison value R1, regardless of the magnitude of the first voltage R, providing a measure of the average. This condition is represented by the area labeled C in the graph of Figure 4. When the second voltage R, connected by the conductors 28c, 29c to the differential relay 51a, is greater than the comparison voltage R1, connected to the comparison voltage terminals of the differential relay 51a, the contact arm 71a is moved to the downward position, contacting the lower contact point 81a, associated therewith, and providing a connection between the conductor 95a and the conductor 100a, and thereby completing the circuit between the voltage source 96a and the stop-process actuator relay 99a, energizing the stop-process actuator relay 99a. Thus, the process is stopped in accordance with Condition C of the statistical quality-control plan described above and illustrated in the graph of Figure 4, regardless of the magnitude of the first voltage $\overline{X}$. Neither of the actuator relays 111, 113 can become energized, because any path to either of these relays must include the conductor 101a, connected to the upper contact point 80a associated with the contact arm 71a, and with the contact arm 71a in its lower position away from the contact point 80a, the path from the conductor 95a to the conductor 101a is broken.

If the second voltage R is greater than the comparison voltage R2 but less than the comparison voltage R1 and the first voltage $\overline{X}$ is less than $\overline{X}2$, it is desired to adjust the process upward. This condition is represented by the area labeled D in the graph of Figure 4. For this condition, the contact arms 71a, 61a, 62a, 63a, and 64a all remain in the upper positions, as shown in Figure 7, but since the second voltage R is greater than the comparison voltage R2, the differential relay 52a causes the contact arm 72a, controlled thereby, to move to its downward position, contacting the contact point 83a. A conducting path is thereby provided from the conductor 95a, through the contact arm 71a, the contact point 80a, the conductor 101a, the contact arm 72a, the contact point 83a, the conductor 103a, the contact arm 62a, the contact point 86a, and the conductor 112, to the adjust-up actuator relay 113. The circuit is completed, therefore, between the voltage source 96a and the adjust-up actuator relay 113, energizing the adjust-up actuator 113 and causing an upward adjustment of the process, as by increasing the opening of the filler machine in a packingfilling process, in accordance with Condition D of the foregoing quality-control plan. Since the contact arm 71a is in its upper position, away from the contact point 81a, the conducting path from the conductor 95a to the conductor 100a is broken, and the stop-process actuator relay 99a is not energized. Since the contact arm 61a is in its upper position away from the contact arm 85a and the contact arm 63a is in its upper position away from the contact arm 89a, the conducting path between the conductor 95a and the conductor 110 is broken and the adjust-down actuator relay 111 is not energized. The adjust-up actuator relay 113, therefore, is the only relay that is energized under Condition D.

If the second voltage R is greater than the comparison voltage R2 but less than the comparison voltage R1, and the first voltage $\overline{X}$ is greater than $\overline{X}2$ and less than $\overline{X}1$, it is desired that no adjustment be made. This condition is represented by the area labeled A in the graph of Figure 4. Under this condition, the contact arm 71a is in its upward position, the contact arm 72a is in its downward position, the contact arm 61a is in its upward position, the contact arm 62a is in its downward position, the contact arm 63a may be in either position, and the contact arm 64a may be in either position. The conducting path between the conductor 95a and the conductor 100a is broken, since the contact arm 71a is in its upper position away from the contact point 81a, and the stop-process actuator relay 99a is not energized. The two possible conducting paths between the conductor 95a and the conductor 110 are open, since the contact arm 61a is in its upper position away from the contact point 85a, thereby breaking the path through the conductor 103a, and since the contact arm 72a is in its downward position away from the contact point 82a, thereby breaking the path through the conductor 102a. The circuit cannot be completed, therefore, between the voltage source 96a and the adjust-down actuator relay 111, and this relay cannot become energized. The two possible conducting paths between the conductor 95a and the conductor 112 are open also, since the contact arm 62a is in its downward position away from the contact point 86a, thereby breaking the path through the conductor 103a, and since the contact arm 72 is in its downward position away from the contact point 82a, thereby breaking the path through the conductor 102a. A circuit cannot be completed, therefore, between the voltage source 96a and the adjust-up actuator relay 113, and this relay 113 cannot become energized. None of the relays 99a, 111, 113 are energized and in accordance with Condition A of the statistical quality-control plan above, no adjustment is made.

When the second voltage R is greater than the comparison voltage R2 and less than the comparison voltage R1, and the first voltage $\overline{X}$ is greater than $\overline{X}1$, it is desired to adjust the process downward. This is the condition represented by the area labeled E in the graph of Figure 4. Under this condition, the contact arm 71a is in its upper position, and all of the other contact arms 12a, 61a, 62a, 63a, 64a are in their downward positions. Since the contact arm 71a is in its upper position away from the contact point 81a, the conducting path between the conductor 95a and the conductor 100a is broken and the stop-process actuator relay 99a is not energized. Both of the possible conducting paths between the conductor 95a and the conductor 112 are open, since the contact arm 72a is in its downward position away from the contact point 82a, thereby breaking the path through the conductor 102a, and since the contact arm 62a is in its downward position away from the contact point 86a, thereby breaking the path through the conductor 103a. The adjust-up actuator relay 113, therefore, is not energized. A conducting path is provided from the conductor 95a, through the contact arm 71a, the contact point 80a, the conductor 101a, the contact arm 72a, which is in its downward position contacting the contact point 83a, the conductor 103a, the contact arm 61a, which is in its downward position contacting the contact point 85a, to the conductor 110. A circuit is completed, therefore, between the voltage source 96a and the adjust-down actuator relay 111, and a downward adjustment of the process is made in accordance with Condition E of the foregoing statistical quality-control plan.

When the second voltage R is less than the comparison voltage R2 and the first voltage $\overline{X}$ is less than $\overline{X}4$, it is desired to adjust the process upward. This is the condition represented by the area labeled F in the graph of Figure 4. Under this condition, the contact arm 71a is in its upper position, the contact arm 72a is in its upper position, the contact arm 61a is in its upper position, the contact arm 62a may be in either position, the contact arm 63a is in its upper position, and the contact arm 64a is in its upper position. Since the contact arm 71a is in its upper position away from the contact point 81a, the conducting path between the conductor 95a and the conductor 100a is broken and the stop-process actuator relay 99a is not energized. Both of the possible conducting paths between the conductor 95a and the conductor 110 are broken, since the contact arm 72a is in its upper position away from the contact point 83a, thereby opening the path through the conductor 103a, and since the contact arm 63a is in its upper position away from the contact point 89a, thereby opening the path through the conductor 102a. The adjust-down actuator relay 111, therefore, is not energized. A conducting path is provided from the conductor 95a through the contact arm 71a, the contact point 80a, the conductor 101a, the contact arm 72a, the contact point 82a, the conductor 102a, the contact arm 64a, which is in its upper position contacting the contact point 90a, to the conductor 112. Thus, a circuit is completed from the voltage source 96a to the adjust-up actuator relay 113, and the process is adjusted upward in accordance with Condition F of the above statistical quality-control plan.

It is desired that no adjustment be made when the second voltage R is less than the comparison voltage R2 and the first voltage $\overline{X}$ is greater than $\overline{X}4$ and less than $\overline{X}3$. This is the condition represented by the area labeled B in the graph of Figure 4. Under this condition, the contact arm 71a is in its upper position, the contact arm 72a is in its upper position, the contact arm 61a is in its upper position, the contact arm 62a is in its downward position, the contact arm 63a is in its upper position, and the contact arm 64a is in its downward position. Since the contact arm 71a is in its upper position away from the contact point 81a, the conducting path between the conductor 95a and the conductor 100a is broken and the stop-process actuator relay 99a is not energized. Both of the possible conducting paths between the conductor 95a and the conductor 110 are broken, since the contact arm 72a is in its upper position away from the contact point 83a, thereby opening the path through the conductor 103a, and since the contact arm 63a is in its upper position away from the contact point 89a, thereby opening the path through the conductor 102a. The adjust-down actuator relay 111, therefore, is not energized. The two possible conducting paths between the conductor 95a and the conductor 112 are broken, since the contact arm 72a is in its upper position away from the contact point 83a, thereby opening the path through the conductor 103a, and since the contact arm 64a is in its downward position away from the contact point 90a, thereby opening the path through the conductor 102a. The adjust-up actuator relay 113, therefore, is not energized. None of the three actuator relays 99a, 111, 113 is energized, and, in accordance with Condition B of the foregoing statistical quality-control plan, no adjustment is made.

When the second voltage R is less than the comparison voltage R2 and the first voltage $\overline{X}$ is greater than $\overline{X}3$, it is desired to adjust the process downward. This is the condition represented by the area labeled G in the graph of Figure 4. Under this condition, the contact arm 71a is in its upper position, the contact arm 72a is in its upper position, the contact arm 61a may be in either position, the contact arm 62a is in its downward position, the contact arm 63a is in its downward position, and the contact arm 64a is in its downward position. Since the contact arm 71a is in its upper position away from the contact point 81a, the conducting path between the conductor 95a and the conductor 100a is broken and the stop-process actuator relay 99a is not energized. The two possible conducting paths between the conductor 95a and the conductor 112 are broken, since the contact arm 72a is in its upward position away from the contact point 83a, thereby opening the path through the conductor 103a, and, since the contact arm 64a is in its downward position away from the contact point 90a, thereby opening the path through the conductor 102a. A conducting path is provided from the conductor 95a through the contact arm 71a, the contact point 80a, the conductor 101a, the contact arm 72a, the contact point 82a, the conductor 102a, the contact arm 63a, which is in its downward position contacting the contact point 89a, to the conductor 110. Thus, a circuit is completed from the voltage source 96a to the adjust-down actuator relay 111, and a compensating downward adjustment is provided in accordance with Condition G of the foregoing statistical quality-control plan.

To summarize, the actuating system of Figure 7 provides no adjustment under Condition A and Condition B, causes the process to be stopped under Condition C, causes the process to be adjusted upward under Condition D, causes the process to be adjusted downward under Condition E, causes the process to be adjusted upward under Condition F, and causes the process to be adjusted downward under Condition G, in accordance with the foregoing statistical quality-control plan, as described above, and as illustrated in the graph of Figure 4.

*Accept-reject control, alternative actuating system*

Figure 8 illustrates another form of actuating system, equivalent to the actuating system of Figure 5, for performing the functions required to accept or reject a series of articles in accordance with the first statistical quality control plan set forth above and illustrated in Figure 3. A first voltage $\overline{X}$, which may provide a measure of the average value of the measurable physical characteristic to be checked for a predetermined number of articles, is connected by means of the conductors 25d and 26d to the horizontal deflection plates 120—120 of a cathode-ray tube 121. A second voltage R (or $\overline{R}$), comprising a measure of the range or difference in value of the measurable characteristic between the two articles having the greatest dissimilarity of the characteristic in the series of articles, or comprising a measure of the average value of the range of values of the measured characteristic for a series of groups of articles, is connected by means of the conductors 28d and 29d to the vertical deflection plates 122—122 of the cathode-ray tube 121. For convenience, in the remainder of the discussion of the actuating system of Figure 8, it will be assumed that the second voltage comprises a measure of the range R. The cathode-ray tube 121 is shown for convenience, as a conventional electrostatic tube comprising an electron gun 123, which may be of conventional construction, serving as a point source of electrons directed toward a fluorescent screen 124, the point at which the electron beam strikes the fluorescent screen 124 being controlled by the deflecting plates 120—120 and 122—122. The components of the cathode-ray tube 121 are contained in an envelope 125. Of course, a magnetic tube using deflector coils rather than deflector plates could be substituted for the electrostatic tube, and the operation of the actuating system would be the same with the first voltage $\overline{X}$ connected to the horizontal deflector coils and with the second voltage R connected to the vertical deflector coils.

A light-proof chamber 126 is provided, as shown in Figure 8, beyond the end of the cathode-ray tube 121, forming in effect an extension of the cathode-ray tube 121. This chamber 126 is shown schematically in Figure 8, in order to permit the illustration of other features of the actuating system, but preferably comprises opaque walls on all sides except the side formed by the screen 124 of the cathode-ray tube 121, so that the only light that can enter the chamber 126 is such light as may be provided by the impinging of an electron beam 127 on the screen 124. A photoelectric cell 128 is positioned and held in place within the chamber 126 in such manner as to be responsive to any light radiated by the fluorescent screen 124. One terminal of the photoelectric cell 128 is connected by means of a conductor 100b to one terminal of a conventional type relay 99b which, when energized, serves as a reject actuator by providing the switching necessary to actuate a rejecting device (not shown) which may be of a type well known in the art for rejecting the group or lot of articles to be rejected. The other terminal of the photoelectric cell 128 is connected by means of a conductor 95b to one side of a battery or other suitable source of direct voltage 96b. The other side of the voltage source 96b is connected by means of a conductor 97b to a contact point 94b, associated with a contact arm 93b, which is connected by means of a conductor 98b to the other terminal of the reject actuator relay 99b. The contact arm 93b is controlled by a conventional type relay 92b which is connected by means of the conductors 25d, 26d to the first voltage $\overline{X}$.

The characteristics of the photoelectric cell 128 are such that when the contact arm 93b is in contact with the contact point 94b, so that a circuit can be completed between the voltage source 96b and the reject actuator 99b, the reject actuator relay 99b will not be energized in the absence of light radiated by the fluorescent screen 124, but the characteristics of the photoelectric cell are such that when the electron beam 127 causes the fluorescent screen 124 to radiate light that will impinge upon the photoelectric cell 128, sufficient current will flow from the voltage source 96b through the photoelectric cell 128 and through the reject actuator relay 99b to energize the reject actuator 99b. When the reject actuator relay 99b is energized, it provides the switching necessary to actuate a rejecting device (not shown) which may be of a type well known in the art for rejecting the group or lot of articles to be rejected.

An opaque mask 129 covers the unused lower portion of the screen 124. A T-shaped opaque mask 130 covers a portion of the screen 124, as shown, so as to block off any light radiated by the screen 124 when the electron beam 127 impinges upon the T-shaped area covered by the mask 130. The conventional adjustments of the cathode-ray tube 121 and the size and shape of the mask 130 are so chosen that the screen 124 and the mask 130 are equivalent to the graph of Figure 3, and the comparison values R1 and R2 of the second voltage R as indicated in Figure 1 and the values $\overline{X}0$, $\overline{X}1$, $\overline{X}2$, $\overline{X}3$, and $\overline{X}4$ of the first voltage $\overline{X}$ as indicated in Figure 8 correspond to the same values as indicated in the graph of Figure 3.

When the second voltage R is greater than the predetermined value R1, the electron beam 127 impinges upon the screen 124 in the unmasked area generally above the mask 130 corresponding to the area labeled Reject, Condition 1 in the graph of Figure 3. When the second voltage R is greater than R2 but less than R1 and the first voltage $\overline{X}$ is less than the predetermined value $\overline{X}2$, or when the second voltage R is less than the predetermined value R2 and the first voltage $\overline{X}$ is less than the predetermined value $\overline{X}4$, the electron beam 127 impinges upon the unmasked area of the screen 124 generally to the left of the mask 130 corresponding to the similarly located areas labeled Reject, Condition 2 and Reject, Condition 3 in the graph of Figure 3. When the second voltage R is greater than R2 and less than R1 and the first voltage $\overline{X}$ is greater than $\overline{X}1$, or when the second voltage R is less than R2 and the first voltage $\overline{X}$ is greater than $\overline{X}3$, the electron beam 127 strikes the screen 124 in the unmasked area generally to the right of the mask 130 corresponding to the similarly located areas labeled Reject, Condition 3 and Reject, Condition 2 in the graph of Figure 3. When the second voltage R is greater than R2 and less than R1 and the first voltage $\overline{X}$ is greater than $\overline{X}2$ and less than $\overline{X}1$, or when the second voltage R is less than R2 and the first voltage $\overline{X}$ is greater than $\overline{X}4$ and less than $\overline{X}3$, the electron beam 127 strikes the masked area 130 of the screen 124 corresponding to the T-shaped area labeled Accept in the graph of Figure 3.

The actuating system of Figure 8 operates in the following manner:

As long as the conventional relay 92b remains unenergized, the contact arm 93b, controlled thereby, remains in the open-circuit position shown in Figure 8. When the predetermined number of articles has been checked, the averaging system 23 and the range computer 24 (Figure 1) simultaneously provide to the actuating system 27 a first voltage $\overline{X}$ and a second voltage R. The first voltage $\overline{X}$ is supplied across the conductors 25d and 26d and the second voltage R is supplied across the conductors 28d and 29d. The first voltage $\overline{X}$ is connected by means of the conductors 25d and 26d to the relay 92b, energizing the relay 92b and causing the contact arm 93b to make contact with the contact point 94b and thereby to connect one terminal of the reject actuator relay 99b to one terminal of the D. C. voltage source 96d by way of the conductor 98b, the contact arm 93b, the contact point 94b, and the conductor 97b. The reject actuator relay 99b is not energized, however, unless a conducting path is provided from the conductor 95b through the photoelectric cell 128 and the conductor 100b to the other terminal of the reject actuator 99b. The photoelectric cell 128 provides a conducting path such as to enable the D. C. voltage source 96b to energize the reject actuator relay 99b only when light is radiated from the screen 124 to the photoelectric cell 128 by virtue of the impinging of the electron beam 127 upon the fluorescent screen 124 at a point in the unmasked area of the screen 124.

When the second voltage R is greater than the predetermined value R1 (Condition 1), when the first voltage $\overline{X}$ is greater than the predetermined value $\overline{X}1$, or is less than the predetermined value $\overline{X}2$ (Condition 2), or when the second voltage R is less than the predetermined value R2 and the first voltage $\overline{X}$ is greater than the predetermined value $\overline{X}3$ or is less than the predetermined value $\overline{X}4$ (Condition 3), the electron beam 127 strikes the screen 124 at a point in the unmasked area around the opaque mask 130. Thus, under any of the foregoing conditions, light is radiated from the screen 124 to the photoelectric cell 128, enabling the D. C. voltage source 96b to energize the reject actuator relay 99b, and causing the group or lot of articles to be rejected in accordance with the statistical quality-control plan first described above and illustrated in the graph of Figure 3.

When the second voltage R is greater than the comparison voltage R2 and less than the comparison voltage R1 and the first voltage $\overline{X}$ is greater than $\overline{X}2$ and less than $\overline{X}1$, or when the second voltage R is less than R2 and the first voltage $\overline{X}$ is greater than $\overline{X}4$, and less than $\overline{X}3$, the electron beam 127 strikes the screen 124 in the area covered by the mask 130. Since the opaque mask 130 blocks off from the photoelectric cell 128 any light radiated by the fluorescent screen 124, the photoelectric cell 128 remains in its nonconducting state and the reject actuator relay 99b, therefore, remains unenergized. Thus, under either of these conditions, the group or lot of articles is accepted in accordance with the predetermined plan first described above and illustrated in the graph of Figure 3.

To summarize, the reject actuator relay 99b remains unenergized, and the group or lot of articles is accepted, under the conditions represented by the shaded area labeled Accept in the graph of Figure 3; while the reject actuator relay 99b is energized, and the group or lot of articles is rejected under the conditions represented by the unshaded areas labeled Reject, Condition 1, Reject, Condition 2, and Reject, Condition 3 in the graph of Figure 3. Thus, the actuating system of Figure 8 provides the required operations of the first statistical quality-control plan described above, and the function of this system is equivalent to that of the actuating system circuit of Figure 5.

*Adjust-or-stop control, alternative actuating system*

Figure 9 illustrates another form of actuating system, equivalent to the actuating system of Figure 7, for performing the functions required to stop or adjust a process where necessary in accordance with the second statistical quality-control plan set forth above and illustrated in Figure 4. A first voltage $\overline{X}$, which may provide a measure of the average value of the measurable physical characteristic to be checked for a predetermined number of articles, is connected by means of the conductors 25e and 26e to the horizontal deflection plates 120a—120a of a cathode-ray tube 121a. A second voltage R (or $\overline{R}$), comprising a measure of the range or difference in value of the measurable characteristic between the two articles having the greatest dissimilarity of the characteristic in the series of articles, or comprising a measure of the average value of the range of values of the measured characteristic for a series of groups of articles, is connected by means of the conductors 28e and 29e to the vertical deflector plates 122a—122a of the cathode-ray tube 121a. For convenience, in the remainder of the discussion of the actuating system of Figure 9, it will be assumed that the second voltage comprises a measure of the range R. The cathode-ray tube 121a is shown, for convenience, as a conventional electrostatic tube comprising an electron gun 123a which may be of conventional construction, serving as a point source of electrons directed toward a fluorescent screen 124a, the point at which the electron beam strikes the fluorescent screen 124a being controlled by the deflecting plates 120a—120a and 122a—122a. The components of the cathode-ray tube 121a are contained in an envelope 125a. Of course, a magnetic tube using deflector coils rather than deflector plates could be substituted for the electrostatic tube, and the operation of the actuating system would be the same with the first voltage $\overline{X}$ connected to the horizontal deflector coils and with the second voltage R connected to the vertical deflector coils.

A light-proof chamber 126a is provided, as shown in Figure 9, beyond the end of the cathode-ray tube 121a, forming in effect an extension of the cathode-ray tube 121a. This chamber 126a is shown schematically in Figure 9, in order to permit the illustration of other features of the actuating system, but preferably comprises opaque walls on all sides, except the side formed by the screen 124a of the cathode-ray tube 121a, so that the only light that can enter the chamber 126a is such light as may be provided by the impinging of an electron beam 127a on the screen 124a. Three photoelectric cells 140, 141, 142 are positioned and held in place within the chamber 126a in such manner as to be responsive to light radiated by the fluorescent screen 124a. The photoelectric cell 140 is surrounded by a green filter 143, the photoelectric cell 141 is surrounded by a red filter 144, and the photoelectric cell 142 is surrounded by a yellow filter 145, so that the photoelectric cells 140, 141, 142 are responsive only to green, red, and yellow light, respectively.

One terminal of the photoelectric cell 140 is connected by means of a conductor 100c to one terminal of a conventional type relay 99c, which, when energized, serves as a stop-process actuator by providing the switching necessary to actuate a shut-down device (not shown) which may be of a type well known in the art for stopping the process involved, as by stopping the operation of the conveyor belts and filling equipment in a package-filling process. The other terminal of the photoelectric cell 140 is connected, by means of a conductor 95c, to one side of a battery or other suitable source of direct voltage 96c. The other side of the voltage source 96c is connected, by means of a conductor 97c, to a contact point 94c, associated with a contact arm 93c, which is connected, by means of a conductor 98c, to the other terminal of the stop-process relay 99c. The contact arm 93c is controlled by a conventional type relay 92c, which is connected by means of the conductors 25e and 26e to the first voltage $\overline{X}$. The characteristics of the photoelectric cell 140 and the green filter 143 surrounding it, are such that when the contact arm 93c is in contact with the contact point 94c, so that a circuit can be completed between the voltage source 96c and the stop-process relay 99c, the stop-process relay 99c will not be energized in the absence of green light radiated by the fluorescent screen 124a, but the characteristics of the photoelectric cell 140 and the surrounding green filter 143 are such that, when the electron beam 127a causes the fluorescent screen 124a to radiate green light that will impinge upon the photoelectric cell 140, sufficient current will flow from the voltage source 96c, through the stop-process relay 99c, to energize the stop-process relay 99c.

One terminal of the photoelectric cell 141 is connected to the conductor 95c. The other terminal of the photoelectric cell 141 is connected, by means of a conductor 110a, to one terminal of a conventional type relay 111a, which, when energized, serves as an adjust-down actuator by providing the switching necessary to actuate an adjusting device (not shown) which may be of a type well known in the art for providing a downward compensating adjustment in the process, as by reducing the opening in the filling equipment used in a package-filling process. The other terminal of the adjust-down actuator relay 111a is connected to the conductor 98c. One terminal of the photoelectric cell 142 is connected to the conductor 95c. The other terminal of the photoelectric cell 142 is connected, by means of a conductor 112a, to one terminal of a conventional type relay 113a, which, when energized, serves as an adjust-up actuator by providing the switching necessary to actuate an adjusting device (not shown) which may be of a type well known in the art for providing a compensating upward adjustment in the process, as by increasing the opening in the filling equipment used in a package-filling process. The other terminal of the adjust-up actuator relay 113a is connected to the conductor 98c. The characteristics of the photoelectric cell 141 and the red filter 144 surrounding it are such that when the contact arm 93c is in contact with the contact point 94c, so that a circuit can be completed between the voltage source 96c and the adjust-down actuator relay 111a, the relay 111a will not be energized in the absence of red light radiated by the fluorescent screen 124a; but the characteristics of the photoelectric cell 141 and the surrounding red filter 144 are such that when the electron beam 127a causes the fluorescent screen 125a to radiate red light that will impinge upon the photoelectric cell 141, sufficient current will flow from the voltage source 96c through the adjust-down actuator relay 111a to energize the relay 111a. The characteristics of the photoelectric cell 142 and the yellow filter 145 surrounding it are such that when the contact arm 93c is in contact with the contact point 94c, so that a circuit can be completed between the voltage source 96c and the adjust-up actuator relay 113a, the relay 113a will not be energized in the absence of yellow light radiated by the fluorescent screen 124a; but the characteristics of the photoelectric cell 142 and the surrounding yellow filter 145 are such that when the electron beam 127a causes the fluorescent screen 124a to radiate yellow light that will impinge upon the photoelectric cell 142, sufficient current will flow from the voltage source 96c through the adjust-up actuator relay 113a to energize the relay 113a.

An opaque mask 129a covers the unused lower portion of the screen 124a. A T-shaped opaque mask 130a covers a portion of the screen 124a, as shown, so as to block off any light radiated by the screen 125a when the electron beam 127a impinges upon the T-shaped area covered by the mask 130a. A green translucent mask or filter 146 covers the area of the screen 124a generally above the mask 130a, as shown in Figure 9, so that when the electron beam 127a impinges upon the area covered by the green mask 146, green light only is radiated into the chamber 126a. A red translucent mask or filter 147 covers the area generally to the right of the mask 130a on the fluorescent screen 124a, as shown in Figure 9, so that when the electron beam 127a impinges upon the area covered by the red mask 147, red light only is radiated into the chamber 126a. A yellow translucent mask or filter 148 covers the area generally to the left of the mask 130a on the fluorescent screen 124a, as shown in Figure 9, so that when the electron beam 127a impinges upon the area covered by the yellow mask 148, yellow light only is radiated into the chamber 126a.

The conventional adjustments of the cathode-ray tube 121a and the sizes and shapes of the opaque mask 130a and the translucent masks 146, 147, 148 are so chosen that the screen 124a and the masks 130a, 146, 147, 148 are equivalent to the graph of Figure 4, and the comparison values R1 and R2 of the second voltage R, as indicated in Figure 9, and the values $\overline{X}0$, $\overline{X}1$, $\overline{X}2$, $\overline{X}3$, and $\overline{X}4$ of the first voltage $\overline{X}$, as indicated in Figure 9, correspond to the same values, as indicated in the graph of Figure 4. When the second voltage R is greater than the predetermined value R1, the electron beam 127a impinges upon the screen 124a in the green masked area 146, generally above the opaque mask 130a corresponding to the area labeled C in the graph of Figure 4, providing green light in the chamber 126a. When the second voltage R is greater than R2 but less than R1 and the first voltage $\overline{X}$ is less than the predetermined value $\overline{X}2$, or when the second voltage R is less than the predetermined value R2 and the first voltage $\overline{X}$ is less than the predetermined value $\overline{X}4$, the electron beam 127a impinges upon the yellow-masked area 148 of the screen 124a, generally to the left of the opaque mask 130a corresponding to the similarly located areas labeled D and F in the graph of Figure 4, providing yellow light in the chamber 126a. When the second voltage R is greater than R2 and less than R1 and the first voltage $\overline{X}$ is greater than $\overline{X}1$, or when the second voltage R is less than R2 and the first voltage $\overline{X}$ is greater than $\overline{X}3$, the electron beam 127a strikes the screen 124a in the red-masked area 147, generally to the right of the opaque mask 130a corresponding to the similarly located areas labeled E and G in the graph of Figure 4, providing red light in the chamber 126a. When the second voltage R is greater than R2 and less than R1 and the first voltage $\overline{X}$ is greater than $\overline{X}2$ and less than $\overline{X}1$, or when the second voltage R is less than R2 and the first voltage $\overline{X}$ is greater than $\overline{X}4$ and less than $\overline{X}3$ the electron beam 127a strikes the masked area 130a of the screen 124a, corresponding to the T-shaped area labeled A and B in the graph of Figure 4.

The actuating system of Figure 9 operates in the following manner:

As long as the conventional relay 92c remains unenergized, the contact arm 93c, controlled thereby, remains in the open-circuit position shown in Figure 9. When the predetermined number of articles has been checked, the averaging system 23 and the range computer 24 (Figure 1) simultaneously provide to the actuating system 27 a first voltage $\overline{X}$ and a second voltage R. The first voltage $\overline{X}$ is supplied across the conductors 25e and 26e and the second voltage R is supplied across the conductors 28e and 29e. The first voltage $\overline{X}$ is connected by means of the conductors 25e and 26e to the relay 92c, energizing the relay 92c and causing the contact arm 93c to make contact with the contact point 94c and thereby to connect one terminal of each of the relays 99c, 111a, 113a to one terminal of the D. C. voltage source 96c, by way of the conductor 98c, the contact arm 93c, the contact point 94c, and the conductor 97c. The stop-process relay 99c is not energized unless a conducting path is provided from the conductor 95c through the photoelectric cell 140 and the conductor 100c to the other terminal of the stop-process relay 99c. The photoelectric cell 140 provides a conducting path, such as to enable the D. C. voltage source 96c to energize the stop-process relay 99c, only when green light is radiated from the screen 124a, through the green filter 143, to the photoelectric cell 140, by virtue of the impinging of the electron beam 127a upon the fluorescent screen 124a at a point in the green-masked area 126 of the screen 124a. When the second voltage R is greater than the predetermined value R1 (Condition C), the electron beam 127a strikes the screen 124a at a point in the green-masked area 146 generally above the opaque mask 130a. Green light is radiated from the screen 124a, through the green filter 143, to the photoelectric cell 140, enabling the D. C. voltage source 96c to energize the stop-process relay 99c, causing the process to be stopped in accordance with Condition C of the second statistical quality-control plan described above and illustrated in the graph of Figure 4.

The adjust-down actuator relay 111a is not energized unless a conducting path is provided from the conductor 95c through the photoelectric cell 141, and the conductor 110a, to the adjust-down actuator relay 111a. The photoelectric cell 141 provides a conducting path such as to enable the D. C. voltage source 96c to energize the adjust-down actuator relay 111a only when red light is radiated from the screen 124a, through the red filter 144, to the photoelectric cell 141, by virtue of the impinging of the electron beam 127a upon the fluorescent screen 124a at a point in the red masked area 147 of the screen 124a. When the second voltage R is greater than R2 and less than R1, and the first voltage $\overline{X}$ is greater than $\overline{X}1$, Condition E, or when the second voltage R is less than R2 and the first voltage $\overline{X}$ is greater than $\overline{X}3$, Condition G, the electron beam 127a strikes the screen 124a at a point in the red-masked area 147, generally to the right of the opaque mask 130a. Red light is radiated from the screen 124a, through the red filter 144, to the photoelectric cell 141, enabling the D. C. voltage source 96c to energize the adjust-down actuator relay 111a, causing the process to be adjusted downward in accordance with Condition E or Condition G of the second statistical quality-control plan described above and illustrated in the graph of Figure 4.

The adjust-up actuator relay 113a is not energized unless a conducting path is provided from the conductor 95c to the photoelectric cell 142 and the conductor 112a to the adjust-up actuator relay 113a. The photoelectric cell 142 provides a conducting path, such as to enable the D. C. voltage source 96c to energize the adjust-up actuator relay 113a, only when yellow light is radiated from the screen 124a, through the yellow filter 145, to the photoelectric cell 142, by virtue of the impinging of the electron beam 127a upon the fluorescent screen 124a at a point in the wellow-masked area 148 of the screen 124a. When the second voltage R is greater than R2 but less than R1 and the first voltage $\overline{X}$ is less than $\overline{X}2$, condition D, or when the second voltage R is less than R2 and the first voltage $\overline{X}$ is less than $\overline{X}4$, Condition F, the electron beam 127a strikes the screen 124a at a point in the yellow-masked area 148, generally to the left of the opaque mask 130a. Yellow light is radiated from the screen 124a, through the yellow filter 145, to the photoelectric cell 142, enabling the D. C. voltage source 96c to energize the adjust-up actuator relay 113a, causing the process to be adjusted upward in accordance with Condition D or Condition F of the second statistical quality-control plan described above and illustrated in the graph of Figure 4.

When the second voltage R is greater than comparison voltage R2 and less than comparison voltage R1 and the first voltage $\overline{X}$ is greater than $\overline{X}2$ and less than $\overline{X}1$, Condition A, or when the second voltage R is less than R2 and the first voltage $\overline{X}$ is greater than $\overline{X}4$ and less than $\overline{X}3$, Condition B, the electron beam 127a strikes the screen 124a in the area covered by the opaque mask 130a. Since the opaque mask 130a blocks off from all of the photoelectric cells 140, 141, 142 any light radiated by the fluorescent screen 124a, the photoelectric cells 140, 141, 142 all remain in the nonconducting state, and all of the relays 99c 111a, 113a, therefore, remain unenergized. Thus, under either of these conditions, no adjustment is made in accordance with Condition A and Condition B of the second statistical quality-control plan described above and illustrated in the graph of Figure 4.

To summarize, the actuating system of Figure 9 provides no adjustment under Condition A and Condition B, causes the process to be stopped under Condition C, causes the process to be adjusted downward under Condition E and Condition G, and causes the process to be adjusted upward under Condition D and Condition F, in accordance with the second statistical quality-control plan described above and illustrated in the graph of Figure 4. Thus, the function of this actuating system is equivalent to that of the actuating system circuit of Figure 7.

*Generalized form of actuating system*

Figure 10 illustrates another form of actuating system, similar to that of Figure 9, capable of performing according to typical generalized operating requirements. In an actuating system of the type illustrated in Figure 10, the conditions for no adjustment, stopping the process, adjusting upward, and adjusting downward, respectively, may comprise any desired functions of the first voltage $\overline{X}$ and the second voltage R, and the amount of adjustment, upward or downward, may be any desired function of the first voltage $\overline{X}$ and the second voltage R.

Referring now to Figure 10, a first voltage $\overline{X}$, which may provide a measure of the average value of the measurable physical characteristic to be checked for a predetermined number of articles, is connected by means of the conductors 25f, 26f to the horizontal deflection plates 120b—120b of a cathode-ray tube 121b. A second voltage R (or $\overline{R}$), comprising a measure of the range, or difference in value of the measurable characteristic between the two articles having the greatest dissimilarity of the characteristic in the series of articles, or comprising a measure of the average value of the range of values of the measured characteristic for a series of groups of articles, is connected by means of the conductors 28f, 29f to the vertical deflector plates 122b—122b of the cathode-ray tube 121b. For convenience, in the remainder of the discussion of the actuating system of Figure 10, it will be assumed that the second voltage comprises a measure of the range R. The cathode-ray tube 121b is shown, for convenience, as a conventional electrostatic tube comprising an electron gun 123b which may be of conventional construction, serving as a point source of electrons directed toward a fluorescent screen 124b, the point at which the electron beam strikes the fluorescent screen 124b being controlled by the deflecting plates 120b—120b and 122b—122b. The components of the cathode-ray tube 121b are contained in an envelope 125b. Of course, a magnetic tube using deflector coils rather than deflector plates could be substituted for the electrostatic tube, and the operation of the actuating system would be the same with the first voltage $\overline{X}$ connected to the horizontal deflector coils and with the second voltage R connected to the vertical deflector coils.

A light-proof chamber 126b is provided, as shown in Figure 10, beyond the end of the cathode-ray tube 121b, forming in effect an extension of the cathode-ray tube 121b. This chamber 126b is shown schematically in Figure 10, in order to permit the illustration of other features of the actuating system, but preferably comprises opaque walls on all sides, except the side formed by the screen 124b of the cathode-ray tube 121b, so that the only light that can enter the chamber 126b is such light as may be provided by the impinging of an electron beam 127b of a predetermined constant intensity, on the screen 124b. Three photoelectric cells 140a, 141a, 142a are positioned and held in place within the chamber 126b in such manner as to be responsive to any light radiated by the fluorescent screen 124b. The photoelectric cell 140a is surrounded by a green filter 143a, the photoelectric cell 141a is surrounded by a red filter 144a, and the photoelectric cell 142a is surrounded by a yellow filter 145a, so that the photoelectric cells 140a, 141a, 142a are responsive only to green, red, and yellow light, respectively.

One terminal of the photoelectric cell 140a is connected by means of a conductor 100d to one terminal of a conventional type relay 99d, which, when energized, serves as a stop-process actuator by providing the switching necessary to actuate a shut-down device (not shown) which may be of a type well known in the art for stopping the process involved, as by stopping the operation of the conveyor belts and filling equipment in a package-filling process. The other terminal of the photoelectric cell 140a is connected by means of a conductor 95d to one side of a battery or other suitable source of direct voltage 96d. The other side of the voltage source 96d is connected by means of a conductor 97d to a contact point 94d associated with a contact arm 93d, which is connected by means of a conductor 98d to the other terminal of the stop-process relay 99d. The contact arm 93d is controlled by a conventional type relay 92d, which is connected by means of the conductors 25f, 26f to the first voltage $\overline{X}$. The characteristics of the photoelectric cell 140a and the green filter 143a surrounding it are such that when the contact arm 93d is in contact with the contact point 94d, so that a circuit can be completed between the voltage source 96d and the stop-process relay 99d, the stop-process relay 99d will not be energized in the absence of green light radiated by the fluorescent screen 124b, but the characteristics of the photoelectric cell 140a and the surrounding green filter 143a are such that when the electron beam 127b causes the fluorescent screen 124b to radiate green light that will impinge upon the photoelectric cell 140a, sufficient current will flow from the voltage source 96d through the stop-process relay 99d to energize the stop-process relay 99d.

One terminal of the photoelectric cell 141a is connected to the conductor 95d. The other terminal of the photoelectric cell 141a is connected by means of a conductor 110b to one terminal of a proportional adjustor 111b, which serves as a proportional downward adjustor providing adjustment in amounts proportional to the voltage across, and current through, it. The downward proportional adjustor 111b may be of a type well known in the art, such as a servo-mechanism for providing a proportional downward compensating adjustment in the process, as by reducing the opening in the filling equipment used in a package-filling process. The other terminal of the downward proportional adjustor 111b is connected to the conductor 98d. One terminal of the photoelectric cell 142a is connected to the conductor 95d. The other terminal of the photoelectric cell 142a is connected by means of a conductor 112b to one terminal of a proportional adjustor 113b, which serves as a proportional upward adjustor providing adjustment in amounts proportional to the voltage across, and current through, it. The upward proportional adjustor 113b may be of a type well known in the art, such as a servo-mechanism for providing a proportional upward compensating adjustment in the process, as by increasing the opening in the filling equipment used in a package-filling process. The other terminal of the upward proportional adjustor 113b is connected to the conductor 98d. The characteristics of the photoelectric cell 141a and the red filter 144a surrounding it are such that when the contact arm 93d is in contact with the contact point 94d, so that a circuit can be completed between the voltage source 96d and the downward proportional adjustor 111b, the photoelectric cell 141a is in a nonconducting state and no current flows in the circuit in the absence of red light radiated by the fluorescent screen 124b; but the characteristics of the photoelectric cell 141a and the surrounding red filter 144a are such that when the electron beam 127b causes the fluorescent screen 124b to radiate red light that will impinge upon the photoelectric cell 141a, current will flow from the voltage source 96d through the photoelectric cell 141a and through the downward proportional adjustor 111b proportionate to the intensity of the light impinging upon the photoelectric cell 141a. The characteristics of the photoelectric cell 142a and the yellow filter 145a surrounding it are such that when the contact arm 93d is in contact with the contact point 94d, so that a circuit can be completed between the voltage source 96d and the upward proportional adjustor 113b, the photoelectric cell 142a is in a nonconducting state and no current flows in the circuit, in the absence of yellow light radiated by the fluorescent screen 124b; but the characteristics of the photoelectric cell 142a and the surrounding yellow filter 145a are such that when the electron beam 127b causes the fluorescent screen 124b to radiate yellow light that will impinge upon the photoelectric cell 142a, current will flow from the voltage source 96d through the photoelectric cell 142a and through the upward proportional adjustor 113b proportionate to the intensity of the light impinging upon the photoelectric cell 142a.

An opaque mask 129b covers the unused lower portion of the screen 124b. An opaque mask 130b having a modified T-shape covers a portion of the screen 124b, as shown, so as to block off any light radiated by the screen 124b when the electron beam 127b impinges upon the area covered by the mask 130b. A green translucent mask or filter 146a covers the area of the screen 124b generally above the mask 130b, as shown in Figure 10, so that when the electron beam 127b impinges upon the area covered by the green mask 146a, green light only is radiated into the chamber 126b. A red translucent mask or filter 147a covers the area generally to the right of the mask 130b on the fluorescent screen 124b, as shown in Figure 10, so that when the electron beam 127b impinges upon the area covered by the red mask 147a, red light only is radiated into the chamber 126b. As is apparent from Figure 10, the red mask 147a is darker in the region bordering on the opaque mask 130b, and is increasingly lighter with increasing horizontal distance from the opaque mask 130b, so that only a low intensity of red light is radiated into the chamber 126b when the electron beam 127b impinges upon the red-masked area in the region bordering upon the opaque mask 130b and the intensity of the red light radiated into the chamber 126b increases as the horizontal distance from the opaque mask 130b to the point of impingement of the electron beam 127b on the fluorescent screen 124b in the red-masked area 147a increases. A yellow translucent mask or filter 148a covers the area generally to the left of the mask 130b on the fluorescent screen 124b, as shown in Figure 10, so that when the electron beam 127b impinges upon the area covered by the yellow mask 148a, yellow light only is radiated into the chamber 126b. As is apparent from Figure 10, the yellow mask 148a is darker in the region bordering on the opaque mask 130b, and is increasingly lighter with increasing horizontal distance from the opaque mask 130b, so that only a low intensity of yellow light is radiated into the chamber 126b when the electron beam 127b impinges upon the yellow masked area in the region bordering upon the opaque mask 130b and the intensity of the yellow light radiated into the chamber 126b increases as the horizontal distance from the opaque mask 130b to the point of impingement of the electron beam 127b on the fluorescent screen 124b in the yellow-masked area 148 increases.

The conventional adjustments of the cathode-ray tube 121b and the sizes and shapes of the opaque mask 130b and the translucent masks 146a, 147a, 148a are so chosen that the screen 124b and the masks 130b, 146a, 147a, and 148a are equivalent to a graph, similar to the graph of Figure 4, illustrating a generalized type of statistical quality-control plan in which $\bar{X}0$, as indicated in Figure 10, represents the value of the first voltage $\bar{X}$ corresponding to the desired average value of the physical characteristic to be controlled, R1, as indicated in Figure 10, represents the value of the second voltage R corresponding to a predetermined value, as a measure of the range or average range of values of the physical characteristic to be controlled, such that it is desired to stop the process if this value is exceeded, the area covered by the opaque mask 130b represents the values of $\bar{X}$, R for which it is desired that no adjustment be made, the area covered by the red mask 147a represents the values of $\bar{X}$, R for which it is desired to make downward adjustment, the amount of adjustment increasing as the horizontal distance from the opaque mask 130b increases, as is indicated by progressively lighter shading, and in which the yellow-masked area 148a represents the values of $\bar{X}$, R for which it is desired to make upward adjustment, the amount of adjustment increasing as the horizontal distance from the opaque mask 130b increases, as is indicated by progressively lighter shading.

Obviously, the size and shape, and corresponding values represented therein, of the opaque no-adjustment area 130b, the green stop-process area 146a, the red adjust-downward area 147a and the yellow adjust-upward area 148a, and the degree and distribution of shading in the upward and downward adjustment areas can be varied to provide the desired control functions, depending upon the particular statistical quality-control plan desired in a given process. While the boundary between the green stop-process area 146a and the other areas is shown in Figure 10 as a horizontal straight line corresponding to the value R1, obviously this boundary could have any desired shape. If desired, additional areas for additional types of adjustment could be provided using different colored masks with an additional photoelectric cell, filter, and associated circuit for each such additional area. In short, an actuating system of the type illustrated in Figure 10 can be adapted to perform the desired control functions for a wide variety of statistical quality-control plans. For convenience, however, the actuating system of Figure 10 and its operation are described herein in connection with a statistical quality-control plan as set forth in the preceding paragraph.

When the second voltage R is greater than the predetermined value R1, the electron beam 127b impinges upon the screen 124b in the green-masked area 146a, generally above the opaque mask 130b, providing green light in the chamber 126b. When the first voltage $\bar{X}$ and the second voltage R are such that the electron beam 127b impinges upon the yellow-masked area 148a of the screen 124b generally to the left of the opaque mask 130a yellow light is provided in the chamber 126b, the light intensity increasing with increasing horizontal distance from the opaque mask 130b. When the first voltage $\bar{X}$ and the second voltage R have such values that the electron beam 127 impinges upon the screen 124b in the red-masked area 147a generally to the right of the opaque mask 130b, red light is provided in the chamber 126b, the intensity of the light increasing with increasing horizontal distance from the opaque mask 130b. When the values of the first voltage $\bar{X}$ and the second voltage R are such as to cause the electron beam 127b to strike the screen 124b in the area covered by the opaque mask 130b, no light is radiated into the chamber 126b.

The actuating system of Figure 10 operates in the following manner:

As long as the conventional relay 92d remains unenergized, the contact arm 93d, controlled thereby, remains in the open-circuit position shown in Figure 10. When the predetermined number of articles has been checked, the averaging system 23 and the range computer 24 (Figure 1) simultaneously provide to the actuating system 27 a first voltage $\bar{X}$ and a second voltage R. The first voltage $\bar{X}$ is supplied across the conductors 25f and 26f and the second voltage R is supplied across the conductors 28f and 29f. The first voltage $\bar{X}$ is connected by means of the conductors 25f and 26f to the relay 92d, energizing the relay 92d and causing the contact arm 93d to make contact with the contact point 94d and thereby to connect one terminal of the stop-process relay 99d and one terminal of each of the proportional adjustors 111b and 113b to one terminal of the D. C. voltage source 96d, by way of the conductor 98d, the contact arm 93d, the contact point 94d, and the conductor 97d. The stop-process relay 99d is not energized unless a conducting path is provided from the conductor 95d through the photoelectric cell 140a and the conductor 100d to the other terminal of the stop-process relay 99d. The photoelectric cell 140a provides a conducting path such as to enable the D. C. voltage source 96d to energize the stop-process relay 99d only when green light is radiated from the screen 124b through the green filter 143a to the photoelectric cell 140a, by virtue of the impinging of the electron beam 127b upon the fluorescent screen 124b at a point in the green-masked area 146a of the screen 124b. When the second voltage R is greater than the predetermined value R1, the electron beam 127b strikes the screen 124b at a point in the green-masked area 146a generally above the opaque mask 130b. Green light is radiated from the screen 124b through the green filter 143a, to the photoelectric cell 140a, enabling the D. C. voltage source 96d to energize the stop-process relay 99d, causing the process to be stopped in accordance with the generalized statistical quality-control plan described above.

The downward proportional adjustor 111b is not actuated unless a conducting path is provided from the conductor 95d through the photoelectric cell 141a and the conductor 110b to the downward proportional adjustor 111d. The photoelectric cell 141a provides a conducting path, such as to enable the D. C. voltage source 96c to actuate the downward proportional adjustor 111b, only when red light is radiated from the screen 124b, through the red filter 144a, to the photoelectric cell 141a, by virtue of the impinging of the electron beam 127b upon the fluorescent screen 124b at a point in the red-masked area 147a of the screen 124b. When the first voltage $\bar{X}$ and the second voltage R have values, such that the electron beam 127b strikes the screen 124b at a point in the red-masked area 147a generally to the right of the opaque mask 130b, red light is radiated from the screen 124b, through the red filter 144a, to the photoelectric cell 141a, the intensity of the light being determined by the horizontal distance from the opaque mask 130b to the point where the electron beam 127b impinges upon the screen 124b. The photoelectric cell 141a becomes conductive, enabling the D. C. voltage source 96d to actuate the downward proportional adjustor 111b, the current in the circuit being proportionate to the intensity of the light reaching the photoelectric cell 141a, causing the process to be adjusted downward in proportion to the horizontal distance between the opaque mask 130b and the point at which the electron beam 127b impinges upon the fluorescent screen 124b, in accordance with the generalized statistical quality-control plan described above.

The upward proportional adjustor 113b is not actuated unless a conducting path is provided from the conductor 95d, through the photoelectric cell 142a and the conductor 112b, to the upward proportional adjustor 113b. The photoelectric cell 142a provides a conducting path, such as to enable the D. C. voltage source 96c to actuate the upward proportional adjustor 113b, only when yellow light is radiated from the screen 124b, through the yellow filter 145a, to the photoelectric cell 142a, by virtue of the impinging of the electron beam 127b upon the fluorescent screen 124b at a point in the yellow-masked area 148a of the screen 124b. When the first voltage $\overline{X}$ and the second voltage R have values, such that the electron beam strikes the screen 124b at a point in the yellow-masked area 148a generally to the left of the opaque mask 130b, yellow light is radiated from the screen 124b, through the yellow filter 145a, to the photoelectric cell 142a, the intensity of the light being determined by the horizontal distance from the opaque mask 130b to the point where the electron beam 127b impinges upon the screen 124b. The photoelectric cell 142a becomes conductive, enabling the D. C. voltage source 96d to actuate the upward proportional adjustor 112b, the current in the circuit being proportionate to the intensity of the light reaching the photoelectric cell 142a, causing the process to be adjusted upward in proportion to the horizontal distance between the opaque mask 130b and the point at which the electron beam 127b impinges upon the fluorescent screen 124b, in accordance with the generalized statistical quality-control plan described above.

When the first voltage $\overline{X}$ and the second voltage R have such values that the electron beam 127b strikes the screen 124b in the area covered by the opaque mask 130b, any light radiated by the fluorescent screen 124b is blocked off by the opaque mask 130b from the chamber 126b, and the photoelectric cells 140a, 141a, 142a, all remain in the nonconductive state, and no current flows through the stop-process actuator 99d, nor through the downward proportional adjustor 111b, nor through the upward proportional adjustor 113b, and no adjustment is made, in accordance with the generalized statistical quality-control plan described above.

To summarize, the actuating system of Figure 10 provides no adjustment when the values of the first voltage $\overline{X}$ and the second voltage R are such that the electron beam 127b impinges upon the area of the fluorescent screen 124b covered by the opaque mask 130b; causes the process to be stopped when the value of the second voltage R is such as to cause the electron beam 127b to strike the screen 124b in the green-masked area 146a; causes the process to be adjusted downward when the values of the first voltage $\overline{X}$ and the second voltage R are such as to cause the electron beam 127b to strike the screen 124b in the red-masked area 147a, the amount of the downward adjustment provided thereby being a predetermined function of the position of the electron beam 127b; and causes the process to be adjusted upward when the values of the first voltage $\overline{X}$ and the second voltage R are such that the electron beam 127b strikes the screen 124b in the yellow-masked area 148a, the amount of the upward adjustment being a predetermined function of the position of the electron beam 127b; all in accordance with a predetermined statistical quality-control plan of the generalized type described above.

It will be apparent from the above description that we have provided a statistical quality-control system by which it is possible to obtain precise control of the variable characteristic for which a series of articles are being checked. The precise control is a result of the use of a control factor which is a composite of an average value plus a range value of the variable characteristic in a group of articles of a predetermined total number or which is a composite of an average value of the variable characteristic in a group of a predetermined total number of articles plus an average value of several ranges of values for a series of groups of articles, which together have the said predetermined total number of articles.

Having thus described our invention, what we claim is:

1. A statistical quality-control system comprising: a measuring system comprising means for checking a series of articles in regard to a measurable physical characteristic thereof that may vary and means for providing a voltage responsive to the value of said measurable physical characteristic for each article in said series; means for producing an output voltage proportionate to the average of the voltages received from said measuring system for a predetermined number of articles, means for producing a second output voltage proportionate to the range of voltages received from said measuring system for said predetermined number of articles, and means for receiving the two output voltages and providing a control response as a predetermined function of both said output voltages.

2. A statistical quality-control system according to claim 1 including additional means for receiving the range output voltages of a series of groups of articles which together have said predetermined number of articles, averaging the series of range voltages and supplying the resultant voltage to the said means for receiving the output voltages as the second output voltage.

3. A statistical quality-control system according to claim 2 wherein said means responsive to said output voltages provides said control response in a portion of the range of one said output voltage, responsive in a predetermined manner to said output voltage, independently of the value of the other said output voltage, and provides said control response in other portions of said output voltage range, responsive to a predetermined function of both of said output voltages in which neither output voltage is controlling by itself but only in combination with the other said output voltage.

4. A statistical quality-control system according to claim 1 wherein said means responsive to said output voltages provides said control response in a portion of the range of one said output voltage, responsive in a predetermined manner to said output voltage, independently of the value of the other said output voltage, and provides said control response in other portions of said output voltage range, responsive to a predetermined function of both of said output voltages in which neither output voltage is controlling by itself but only in combination with the other said output voltage.

5. A statistical quality-control system comprising a measuring system comprising means for checking a series of articles in regard to a measurable physical characteristic thereof that may vary and means for providing a voltage responsive to the value of said measurable physical characteristic for each article in said series; an averaging system connected to said measuring system to receive each said voltage from said measuring system as an input voltage and comprising means for providing a first output voltage proportionate to the average of the input voltages received from said measuring system for a predetermined number of articles, said first output voltage providing a measure of the average value of said physical characteristic for said predetermined number of articles; a range computer connected to said measuring system to receive each said voltage from said measuring system as an input voltage and comprising means for providing a second output voltage proportionate to the algebraic difference between the input voltages received from said measuring system having the greatest difference in algebraic value for said predetermined number of articles, said second output voltage providing a measure of the difference in value of said physical characteristic between the two articles, in said predetermined number of articles, having the greatest dissimiliarity of said characteristic; and an actuating system connected to said averaging system to receive said first output voltage, and connected to said range computer to receive said second output voltage, and comprising means responsive to said first output voltage and said second output voltage for providing a control response as a predetermined function of both said output voltages.

6. A statistical quality-control system according to claim 5, in which said means responsive to said output voltages provides said control response in a portion of the range of one said output voltage, responsive in a predetermined manner to said output voltage, independently of the value of the other said output voltage, and provides said control response in other portions of said output voltage range, responsive to a predetermined function of both of said output voltages in which neither output voltage is controlling by itself but only in combination with the other said output voltage.

7. A statistical quality-control system comprising a measuring system comprising means for checking a series of articles in regard to a measurable physical characteristic thereof that may vary and means for providing a voltage responsive to the value of said measurable physical characteristic for each article in said series; a first averaging system connected to said measuring system to receive each said voltage from said measuring system as an input voltage and comprising means for providing a first output voltage proportionate to the average of the input voltages received from said measuring system for a predetermined total number of articles, said first output voltage providing a measure of the average value of said physical characteristic for said predetermined total number of articles; a range computer connected to said measuring system to receive each said voltage from said measuring system as an input voltage and comprising means for providing a range-responsive voltage proportionate to the algebraic difference between the input voltages received from said measuring system having the greatest difference in algebraic value for each group of a predetermined series of groups of articles comprising said predetermined total number of articles, said range-responsive voltage providing a measure of the difference in value of said physical characteristic between the two articles, in each said group of articles, having the greatest dissimilarity of said characteristic; a second averaging system connected to said range computer to receive each said range-responsive voltage from said range computer as an input voltage and comprising means for providing a second output voltage proportionate to the average of the input voltages received from said range computer for said predetermined series of groups comprising said predetermined total number of articles, said second output voltage providing a measure of the average value of said differences in value of said physical characteristic for said series of groups in said predetermined total number of articles; and an actuating system connected to said first averaging system to receive said first output voltage, and connected to said second averaging system to receive said second output voltage, and comprising means responsive to said first output voltage and said second output voltage for providing a control response as a predetermined function of both said output voltages.

8. A statistical quality-control system according to claim 7, in which said means responsive to said output voltages provides said control response in a portion of the range of one said output voltage, responsive in a predetermined manner to said output voltage, independently of the value of the other said output voltage, and provides said control response, in other portions of said output voltage range, responsive to a predetermined function of both said output voltages in which neither output voltage is controlling by itself but only in combination with the other said output voltage.

9. An actuating system comprising input means connected to a first voltage and to a second voltage; and means responsive to said first voltage and to said second voltage for providing a control factor as a predetermined function of said voltages, and including: a cathode-ray tube including an electron gun, a fluorescent screen, horizontal deflection means connected to said first voltage, vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first electrically actuatable response-control means connected to said voltage source in series with said first photoelectric means; second electrically actuatable response-control means connected to said voltage source in series with said second photoelectric means; and third electrically actuatable response-control means connected to said voltage source in series with said third photoelectric means.

10. An actuating system according to claim 9 in which said first electrically actuatable response-control means comprises relay means, said second electrically actuatable response-control means comprises proportional adjusting means operable to provide adjustment in one direction, and said third electrically actuatable response-control means comprises proportional adjusting means operable to provide adjustment opposite to that provided by said first-mentioned proportional adjusting means.

11. An actuating system according to claim 9 in which the darkness of said translucent mask of said second color varies in a predetermined manner over its area, in which the darkness of said translucent mask of said third color varies in a predetermined manner over its area, and in which said first electrically actuatable response-control means comprises relay means, said second electrically actuatable response-control means comprises proportional adjusting means operable to provide adjustment in one direction proportional to the intensity of any light passing through said translucent mask of said second color, and said third electrically actuatable response control means comprises proportional adjusting means operable to provide adjustment opposite to that provided by said first-mentioned proportional adjusting means and proportional to the intensity of any light passing through said translucent mask of said third color.

12. A statistical quality-control system comprising: a measuring system comprising means for checking a series of articles in regard to a measurable physical characteristic thereof that may vary and means for providing a voltage responsive to the value of said measurable physical characteristic for each article in said series; means for producing an output voltage proportionate to the average of the voltages received from said measuring system for a predetermined number of articles, means for producing a second output voltage proportionate to the range of voltages received from said measuring system for said predetermined number of articles, and means for receiving the two output voltages and providing a control factor as a predetermined function of both said output voltages; said means for receiving the two output voltages being an actuating system, said actuating system comprising: input means connected to said first voltage and to said second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value.

13. A statistical quality-control system according to claim 12 in which said means responsive to said first and second voltages provides a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value, said first value being greater than said third value, said third value being greater than said fourth value and said fourth value being greater than said second value.

14. A statistical quality-control system according to claim 12 in which said actuating system includes a voltage source and a response-control relay; in which said first-mentioned control response means comprises a differential relay connected to said second voltage and operatively connected to control switching means connected between said voltage source and said response-control relay; in which said second-mentioned control response means comprises a differential relay connected to said second voltage and four differential relays connected in parallel to said first voltage, said differential relay connected to said second voltage being responsive to a lower voltage than the response voltage of said first-mentioned differential relay connected to said second voltage, each said differential relay connected to said first voltage being responsive to a different voltage, and each said differential relay being operatively connected respectively to control respective switching means connected between said voltage source and said response-control relay.

15. A statistical quality-control system according to claim 12 in which said actuating system includes a voltage source and a response-control relay; in which said first-mentioned control response means comprises means responsive to said predetermined high value of voltage connected to said second voltage and operatively connected to control switching means connected between said voltage source and said response-control relay; in which said second-mentioned control response means comprises means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

16. A statistical quality-control system according to claim 15 in which at least one of said predetermined-voltage responsive means comprises a vacuum tube circuit including a pair of vacuum tubes each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

17. A statistical quality-control system comprising: a measuring system comprising means for checking a series of articles in regard to a measurable physical characteristic thereof that may vary and means for providing a voltage responsive to the value of said measurable physical characteristic for each article in said series; an averaging system including means for producing a first output voltage proportionate to the average of the voltages received from said measuring system for a predetermined number of articles, means for producing a second output voltage proportionate to the range of voltages received from said measuring system for said predetermined number of articles, means for receiving the range output voltages of a series of groups of articles which together have said predetermined number of articles, averaging the series of range voltages and supplying the resultant voltage to the said means for receiving the output voltage as the second output voltage, means for receiving the two output voltages and providing a control factor as a predetermined function of both of said output voltages; said means for receiving the two output voltages being an actuating system, said actuating system comprising: input means connected to said first voltage and to said second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value.

18. A statistical quality-control system according to claim 17 in which said actuating system comprises a voltage source and a response-control relay; in which said first-mentioned control response means comprises a differential relay connected to said second voltage and operatively connected to control switching means connected between said voltage source and said response-control relay; in which said second-mentioned control response means comprises a differential relay connected to said second voltage and four differential relays connected in parallel to said first voltage, said differential relay connected to said second voltage being responsive to a lower voltage than the response voltage of said first-mentioned differential relay connected to said second voltage, each said differential relay connected to said first voltage being responsive to a different voltage, and each said differential relay being operatively connected respectively to control respective switching means connected between said voltage source and said response-control relay.

19. A statistical quality-control system according to claim 17 in which said actuating system comprises a voltage source and a response-control relay; in which said first-mentioned control response means comprises means responsive to said predetermined high value of voltage connected to said second voltage and operatively connected to control switching means connected between said voltage source and said response-control relay; in which said second-mentioned control response means comprises means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

20. A statistical quality-control system according to claim 19 in which at least one said predetermined-voltage-responsive means comprises a vacuum tube circuit including a pair of vacuum tubes each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

21. A statistical quality-control system comprising: a measuring system comprising means for checking a series of articles in regard to a measurable physical characteristic thereof that may vary and means for providing a voltage responsive to the value of said measurable physical characteristic for each article in said series; means for producing an output voltage proportionate to the average of the voltages received from said measuring system for a predetermined number of articles, means for producing a second output voltage proportionate to the range of voltages received from said measuring system for said predetermined number of articles, and means for receiving the two output voltages and providing a control response as a predetermined function of both said output voltages, said means for receiving the two output voltages being an actuating system, said actuating system comprising: input means connected to said first voltage and to said second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value, a cathode ray tube which includes an electron gun, a fluorescent screen, said means responsive to the first voltage including horizontal deflection means connected to said first voltage; said means responsive to the second voltage including vertical deflection means connected to said second voltage, and an opaque mask on said fluorescent screen covering a predetermined area thereon; a chamber so constructed and positioned as to permit the entry of light radiated by said fluorescent screen and to reject light from any other source; photoelectric means in said chamber responsive to light radiated by said fluorescent screen; and a response-control relay connected to a voltage source in series with said photoelectric means.

22. A statistical quality-control system comprising: a measuring system comprising means for checking a series of articles in regard to a measurable physical characteristic thereof that may vary and means for providing a voltage responsive to the value of said measurable physical characteristic for each article in said series; an averaging system including means for producing a first output voltage proportionate to the average of the voltages received from said measuring system for a predetermined number of articles, means for producing a second output voltage proportionate to the range of voltages received from said measuring system for said predetermined number of articles, means for receiving the range output voltages of a series of groups of articles which together have said predetermined number of articles, averaging the series of range voltages and supplying the resultant voltage to the said means for receiving the output voltage as the second output voltage, means for receiving the two output voltages and providing a control response as a predetermined function of both of said output voltages; said means for receiving the two output voltages being an actuating system comprising; input means connected to said first voltage and to said second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value; a cathode ray tube which includes an electron gun, a fluorescent screen, said means responsive to the first voltage including horizontal deflection means connected to said first voltage; said means responsive to the second voltage including vertical deflection means connected to said second voltage, and an opaque mask on said fluorescent screen covering a predetermined area thereon; a chamber so constructed and positioned as to permit the entry of light radiated by said fluorescent screen and to reject light from any other source; photoelectric means in said chamber responsive to light radiated by said fluorescent screen; and a response-control relay connected to a voltage source in series with said photoelectric means.

23. A statistical quality-control system comprising: a measuring system comprising means for checking a series of articles in regard to a measurable physical characteristic thereof that may vary and means for providing a voltage responsive to the value of said measurable physical characteristic for each article in said series; means for producing an output voltage proportionate to the average of the voltages received from said measuring system for a predetermined number of articles, means for producing a second output voltage proportionate to the range of voltages received from said measuring system for said predetermined number of articles, and means for receiving the two output voltages and providing a control factor as a predetermined function of both said output voltages, said means for receiving the two output voltages being an actuating system, said actuating system comprising; input means connected to a first voltage and to a second voltage; means responsive to said second voltage for providing a first predetermined control response when said second voltage is greater than a predetermined high value; means responsive to said first voltage and said second voltage interdependently for providing a second predetermined control response when said second voltage is greater than a predetermined lower value and less than said predetermined high value and said first voltage is greater than a predetermined first value, and when said second voltage is less than said predetermined lower value and said first voltage is greater than a predetermined third value; and means responsive to said first voltage and said second voltage interdependently for providing a third predetermined control response when said second voltage is greater than said predetermined lower value and less than said predetermined high value and said first voltage is less than a predetermined second value, and when said second voltage is less than said predetermined lower value and said first voltage is less than a predetermined fourth value.

24. A statistical quality-control system according to claim 23 in which said actuating system includes a voltage source, a first response-control relay means, a second response-control relay means, and a third response-control relay means: in which said first control-response means comprises a differential relay connected to said second voltage and responsive to any voltage greater than said predetermined high value, operatively connected to control switching means connected between said voltage source and said first response-control relay means; in which said second control response means comprises a differential relay connected to said second voltage and responsive to any voltage greater than said predetermined lower value, operatively connected to control switching means connected between said voltage source and said second and third response-control relay means, first differential relay means connected to said first voltage, and third differential relay means connected to said first voltage, said first differential relay means being responsive to any voltage greater than said predetermined first value, and said third differential relay means being responsive to any voltage greater than said predetermined third value, said first differential relay means and said third differential relay means being respectively operatively connected to control respective switching means connected between said voltage source and said second response-control relay means; and in which said third control-response means comprises said differential relay means connected to said second voltage and responsive to any voltage greater than said predetermined lower value and said switching means operatively connected thereto, second differential relay means connected to said first voltage, and fourth differential relay means connected to said first voltage, said second differential relay means being responsive to any voltage greater than said predetermined second value, and said fourth differential relay means being responsive to any voltage greater than said predetermined fourth value, said second differential relay means and said fourth differential relay means being respectively operatively connected to control respective switching means connected between said voltage source and said third response-control relay means.

25. A statistical quality-control system according to claim 23 in which said actuating system comprises a voltage source and a response-control relay; in which said first-mentioned control response means comprises means responsive to said predetermined high value of voltage connected to said second voltage and operatively connected to control switching means connected between said voltage source and said response-control relay; in which said second-mentioned control response means comprises means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

26. A statistical quality-control system according to claim 25 in which at least one said predetermined-voltage responsive means comprises a vacuum tube circuit including a pair of vacuum tubes, each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

27. A statistical quality-control system according to claim 23 in which said actuating system comprises a cathode-ray tube which includes an electron gun, a fluorescent screen, said means responsive to the first voltage including horizontal deflection means connected to said first voltage, said means responsive to the second voltage including vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first response-control relay means connected to said voltage source in series with said first photoelectric means; second response-control relay means connected to said voltage source in series with said second photoelectric means; and third response-control relay means connected to said voltage source in series with said third photoelectric means.

28. A statistical quality-control system comprising: a measuring system comprising means for checking a series of articles in regard to a measurable physical characteristic thereof that may vary and means for providing a voltage responsive to the value of said measurable physical characteristic for each article in said series; an averaging system including means for producing a first output voltage proportionate to the average of the voltages received from said measuring system for a predetermined number of articles, means for producing a second output voltage proportionate to the range of voltages received from said measuring system for said predetermined number of articles, means for receiving the range output voltages of a series of groups of articles which together have said predetermined number of articles, averaging the series of range voltages and supplying the resultant voltage to the said means for receiving the output voltage as the second output voltage, means for receiving the two output voltages and providing a control factor as a predetermined function of both of said output voltages, said means for receiving the two output voltages being an actuating system, said actuating system comprising: input means connected to a first voltage and to a second voltage; means responsive to said second voltage for providing a first predetermined control response when said second voltage is greater than a predetermined high value; means responsive to said first voltage and said second voltage interdependently for providing a second predetermined control response when said second voltage is greater than a predetermined lower value and less than said predetermined high value and said first voltage is greater than a predetermined first value, and when said second voltage is less than said predetermined lower value and said first voltage is greater than a predetermined third value; and means responsive to said first voltage and said second voltage interdependently for providing a third predetermined control response when said second voltage is greater than said predetermined lower value and less than said predetermined high value and said first voltage is less than a predetermined second value, and when said second voltage is less than said predetermined lower value and said first voltage is less than a predetermined fourth value.

29. A statistical quality-control system according to claim 28 in which said actuating system includes a voltage source, a first response-control relay means, a second response-control relay means, and a third response-control relay means; in which said first control-response means comprises a differential relay connected to said second voltage and responsive to any voltage greater than said predetermined high value, operatively connected to control switching means connected between said voltage source and said first response-control relay means; in which said second control response means comprises a differential relay connected to said second voltage and responsive to any voltage greater than said predetermined lower value, operatively connected to control switching means connected between said voltage source and said second and third response-control relay means, first differential relay means connected to said first voltage, and third differential relay means connected to said first voltage, said first differential relay means being responsive to any voltage greater than said predetermined first value, and said third differential relay means being responsive to any voltage greater than said predetermined third value, said first differential relay means and said third differential relay means being respectively operatively connected to control respective switching means connected between said voltage source and said second response-control relay means; and in which said third control-response means comprises said differential relay means connected to said second voltage and responsive to any voltage greater than said predetermined lower value and said switching means operatively connected thereto, second differential relay means connected to said first voltage, and fourth differential relay means connected to said first voltage, said second differential relay means being responsive to any voltage greater than said predetermined second value, and said fourth differential relay means being responsive to any voltage greater than said predetermined fourth value, said second differential relay means and said fourth differential relay means being respectively operatively connected to control respective switching means connected between said voltage source and said third response-control relay means.

30. A statistical quality-control system according to claim 29 in which said actuating system comprises a cathode-ray tube which includes an electron gun, a fluorescent screen, said means responsive to the first voltage including horizontal deflection means connected to said first voltage, said means responsive to the second voltage including vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first response-control relay means connected to said voltage source in series with said first photoelectric means; second response-control relay means connected to said voltage source in series with said second photoelectric means; and third response-control relay means connected to said voltage source in series with said third photoelectric means.

31. A statistical quality-control system according to claim 28 in which said actuating system comprises a voltage source and a response-control relay; in which said first-mentioned control response means comprises means responsive to said predetermined high value of voltage connected to said second voltage and operatively connected to control switching means connected between said voltage source and said response-control relay; in which said second-mentioned control response means comprises means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

32. A statistical quality-control system according to claim 31 in which at least one said predetermined-voltage responsive means comprises a vacuum tube circuit including a pair of vacuum tubes each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

33. A statistical quality-control system comprising: a measuring system comprising means for checking a series of articles in regard to a measurable physical characteristic thereof that may vary and means for providing a voltage responsive to the value of said measurable physical characteristic for each article in said series; means for producing an output voltage proportionate to the average of the voltages received from said measuring system for a predetermined number of articles, means for producing a second output voltage proportionate to the range of voltages received from said measuring system for said predetermined number of articles, and means for receiving the two output voltages and providing a control factor as a predetermined function of both said output voltages, said means for receiving the two output voltages being an actuating system comprising input means connected to a first voltage and to a second voltage; and means responsive to said first voltage and to said second voltage for providing a control factor as a predetermined function of said voltages, and including: a cathode-ray tube including an electron gun, a fluorescent screen, horizontal deflection means connected to said first voltage, vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first electrically actuatable response-control means connected to said voltage source in series with said first photoelectric means; second electrically actuatable response-control means connected to said voltage source in series with said second photoelectric means; and third electrically actuatable response-control means connected to said voltage source in series with said third photoelectric means.

34. A statistical quality-control system according to claim 33 in which said first electrically actuatable response-control means comprises relay means, said second electrically actuatable response-control means comprises proportional adjusting means operable to provide adjustment in one direction, and said third electrically actuatable response-control means comprises proportional adjusting means operable to provide adjustment opposite to that provided by said first-mentioned proportional adjusting means.

35. A statistical quality-control system comprising: a measuring system comprising means for checking a series of articles in regard to a measurable physical characteristic thereof that may vary and means for providing a voltage responsive to the value of said measurable physical characteristic for each article in said series; an averaging system including means for producing a first output voltage proportionate to the average of the voltages received from said measuring system for a predetermined number of articles, means for producing a second output voltage proportionate to the range of voltages received from said measuring system for said predetermined number of articles, means for receiving the range output voltages of a series of groups of articles which together have said predetermined number of articles, averaging the series of range voltages and supplying the resultant voltage to the said means for receiving the output voltage as the second output voltage, means for receiving the two output voltages and providing a control factor as a predetermined function of both of said output voltages; said means for receiving the two output voltages being an actuating system comprising input means connected to a first voltage and to a second voltage; and means responsive to said first voltage and to said second voltage for providing a control factor as a predetermined function of said voltages, and including: a cathode-ray tube including an electron gun, a fluorescent screen, horizontal deflection means connected to said first voltage, vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first electrically actuatable response-control means connected to said voltage source in series with said first photoelectric means; second electrically actuatable response-control means connected to said voltage source in series with said second photoelectric means; and third electrically actuatable response-control means connected to said voltage source in series with said third photoelectric means.

36. A statistical quality-control system according to claim 29 in which said first electrically actuatable response-control means comprises relay means, said second electrically actuatable response-control means comprises proportional adjusting means operable to provide adjustment in one direction, and said third electrically actuatable response-control means comprises proportional adjusting means operable to provide adjustment opposite to that provided by said first-mentioned proportional adjusting means.

37. An actuating system comprising: input means connected to a first voltage and to a second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value; a voltage source and a response control relay, said first-mentioned control response means comprising a differential relay connected to said second voltage and operatively connected to control switching means connected between said voltage source and said response-control relay; said second mentioned control response means comprising a differential relay connected to said second voltage and four differential relays connected in parallel to said first voltage, said differential relay connected to said second voltage being responsive to a lower voltage than the response voltage of said first-mentioned differential relay connected to said second voltage, each said differential relay connected to said first voltage being responsive to a different voltage, and each said differential relay being operatively connected respectively to control respective switching means connected between said voltage source and said response-control relay.

38. An actuating system comprising: input means connected to a first voltage and to a second voltage; means responsive to said second voltage for providing a control response when said second voltage is greater than a predetermined high value; and means responsive to said first voltage and said second voltage interdependently for providing a control response when said second voltage is less than said predetermined high value and greater than a predetermined low value and said first voltage is greater than a predetermined first value or is less than a predetermined second value, and when said second voltage is less than said predetermined lower value and said first voltage is greater than a predetermined third value or is less than a predetermined fourth value, a voltage source and a response control relay, said first-mentioned control response means comprising means responsive to said predetermined high value of voltage connected to said second voltage and operatively connected to control switching means connected between said voltage source and said response-control relay; said second-mentioned control response means comprising means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

39. An actuating system according to claim 38 in which at least one of said predetermined voltage responsive means comprises a vacuum tube circuit including a pair of vacuum tubes each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

40. An actuating system comprising input means connected to a first voltage and to a second voltage; means responsive to said second voltage for providing a first predetermined control response when said second voltage is greater than a predetermined high value; means responsive to said first voltage and said second voltage interdependently for providing a second predetermined control response when said second voltage is greater than a predetermined lower value and less than said predetermined high value and said first voltage is greater than a predetermined first value, and when said second voltage is less than said predetermined lower value and said first voltage is greater than a predetermined third value; and means responsive to said first voltage and said second voltage interdependently for providing a third predetermined control response when said second voltage is greater than said predetermined lower value and less than said predetermined high value and said first voltage is less than a predetermined second value, and when said second voltage is less than said predetermined lower value and said first voltage is less than a predetermined fourth value; a voltage source, a first response-control relay means, a second response-control relay means, and a third response-control relay means; in which said first control-response means comprises a differential relay connected to said second voltage and responsive to any voltage greater than said predetermined high value, operatively connected to control switching means connected between said voltage source and said first response-control relay means; in which said second control response means comprises a differential relay connected to said second voltage and responsive to any voltage greater than said predetermined lower value, operatively connected to control switching means connected between said voltage source and second second and third response-control relay means, first differential relay means connected to said first voltage, and third differential relay means connected to said first voltage, said first differential relay means being responsive to any voltage greater than said predetermined first value, and said third differential relay means being responsive to any voltage greater than said predetermined third value, said first differential relay means and said third differential relay means being respectively operatively connected to control respective switching means connected between said voltage source and said second response-control relay means; and in which said third control-response means comprises said differential relay means connected to said second voltage and responsive to any voltage greater than said predetermined lower value and said switching means operatively connected thereto, second differential relay means connected to said first voltage, and fourth differential relay means connected to said first voltage, said second differential relay means being responsive to any voltage greater than said predetermined second value, and said fourth differential relay means being responsive to any voltage greater than said predetermined fourth value, said second differential relay means and said fourth differential relay means being respectively connected to control respective switching means connected between said voltage source and said third response-control relay means.

41. An actuating system according to claim 40 which includes a voltage source and a response-control relay; in which said first-mentioned control response means comprises means responsive to said predetermined high value of voltage connected to said second voltage and operatively connected to control switching means connected between said voltage source and said response-control relay; in which said second-mentioned control response means comprise means responsive to said predetermined low value of voltage connected to said second voltage and four means each responsive to a different predetermined value of voltage connected in parallel to said first voltage, each said predetermined-voltage responsive means being operatively connected respectively to control respective switching means connected between said voltage source and said response-control relay.

42. An actuating system according to claim 41 in which at least one said predetermined voltage responsive means comprises a vacuum tube circuit including a pair of vacuum tubes each comprising at least a cathode, a plate and a control grid, means for connecting the second voltage to the control grid of the first vacuum tube, means for connecting a comparison voltage to the control grid of the second vacuum tube, the cathodes of the two vacuum tubes being connected together and to a ground terminal, a voltage source having its negative terminal connected to the ground terminal and its positive terminal connected to the plate of the second vacuum tube and to one terminal of a conventional type relay, the other terminal of the relay being connected to the plate of the first vacuum tube, the relay operating said respective switching means associated therewith.

43. An actuating system comprising input means connected to a first voltage and to a second voltage; means responsive to said second voltage for providing a first predetermined control response when said second voltage is greater than a predetermined high value; means responsive to said first voltage and said second voltage interdependently for providing a second predetermined control response when said second voltage is greater than a predetermined lower value and less than said predetermined high value and said first voltage is greater than a predetermined first value, and when said second voltage is less than said predetermined lower value and said first voltage is greater than a predetermined third value; and means responsive to said first voltage and said second voltage interdependently for providing a third predetermined control response when said second voltage is greater than said predetermined lower value and less than said predetermined high value and said first voltage is less than a predetermined second value, and when said second voltage is less than said predetermined lower value and said first voltage is less than a predetermined fourth value, a cathode ray tube which includes an electron gun, a fluorescent screen, said means responsive to the first voltage including horizontal deflection means connected to said first voltage, said means responsive to the second voltage including vertical deflection means connected to said second voltage, an opaque mask on said fluorescent screen covering a predetermined area thereon, a translucent mask of a first color on said fluorescent screen covering a predetermined first area thereon, a translucent mask of a second color on said fluorescent screen covering a predetermined second area thereon, and a translucent mask of a third color on said fluorescent screen covering a predetermined third area thereon, a chamber so constructed and positioned as to permit the entry of light radiated by said fluorescent screen and to reject light from any other source; first photoelectric means in said chamber surrounded by a filter of said first color and responsive to light of said first color radiated by said fluorescent screen; second photoelectric means in said chamber surrounded by a filter of said second color and responsive to light of said second color radiated by said fluorescent screen; third photoelectric means in said chamber surrounded by a filter of said third color and responsive to light of said third color radiated by said fluorescent screen; a voltage source; first response-control relay means connected to said voltage source in series with said first photoelectric means; second response-control relay means connected to said voltage source in series with said second photoelectric means; and third response-control relay means connected to said voltage source in series with said third photoelectric means.

References Cited in the file of this patent

UNITED STATES PATENTS

| | | |
|---|---|---|
| 2,315,287 | Holloway | Mar. 30, 1943 |
| 2,419,583 | McDavitt | Apr. 29, 1947 |
| 2,455,532 | Sunstein | Dec. 7, 1948 |
| 2,497,883 | Harris, Jr. | Feb. 21, 1950 |
| 2,528,020 | Sunstein | Oct. 31, 1950 |
| 2,559,718 | Goodlett et al. | July 10, 1951 |
| 2,560,172 | Jones | July 10, 1951 |
| 2,625,265 | Cox | Jan. 13, 1953 |
| 2,679,355 | Savino | May 25, 1954 |
| 2,688,459 | Merrill et al. | Sept. 7, 1954 |
| 2,689,082 | Kolisch | Sept. 14, 1954 |